United States Patent
Kim et al.

(10) Patent No.: US 10,914,483 B2
(45) Date of Patent: Feb. 9, 2021

(54) ARTIFICIAL INTELLIGENCE AIR CONDITIONER AND CONTROL METHOD THEREOF

(71) Applicant: LG Electronics Inc., Seoul (KR)

(72) Inventors: Myongsun Kim, Seoul (KR); Bina Kim, Seoul (KR); Jungho Yeom, Seoul (KR); Younju Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 16/198,012

(22) Filed: Nov. 21, 2018

(65) Prior Publication Data
US 2019/0154290 A1  May 23, 2019

(30) Foreign Application Priority Data
Nov. 21, 2017  (KR) ................. 10-2017-0155774

(51) Int. Cl.
| | |
|---|---|
| F24F 11/39 | (2018.01) |
| F24F 11/56 | (2018.01) |
| B01D 46/46 | (2006.01) |
| B01D 46/44 | (2006.01) |
| B01D 46/00 | (2006.01) |
| B01D 46/12 | (2006.01) |
| F24F 11/526 | (2018.01) |
| F24F 11/64 | (2018.01) |
| F24F 13/28 | (2006.01) |
| F24F 110/50 | (2018.01) |
| F24F 3/16 | (2021.01) |

(52) U.S. Cl.
CPC ............ F24F 11/39 (2018.01); B01D 46/008 (2013.01); B01D 46/0023 (2013.01); B01D 46/0032 (2013.01); B01D 46/0038 (2013.01); B01D 46/12 (2013.01); B01D 46/46 (2013.01); F24F 11/56 (2018.01); *B01D 46/0086* (2013.01); *B01D 46/442* (2013.01); *B01D 2279/50* (2013.01); *F24F 3/1603* (2013.01); *F24F 11/526* (2018.01); *F24F 11/64* (2018.01); *F24F 13/28* (2013.01); *F24F 2110/50* (2018.01)

(58) Field of Classification Search
CPC .......... F24F 11/39; F24F 11/56; F24F 11/526; F24F 11/64; F24F 2110/50; F24F 2110/64; F24F 3/1603; F24F 13/28; B01D 46/0086; B01D 46/442; B01D 46/008; B01D 2279/50
See application file for complete search history.

(56) References Cited

U.S. PATENT DOCUMENTS

2006/0187070 A1 *  8/2006  Liang ................. G01F 1/74
340/607

FOREIGN PATENT DOCUMENTS

| KR | 1020090003873 | 1/2009 |
|---|---|---|
| KR | 1020100089605 | 8/2010 |
| KR | 101020171 | 3/2011 |
| KR | 101289647 | 7/2013 |

* cited by examiner

*Primary Examiner* — Robert Clemente
(74) *Attorney, Agent, or Firm* — Fish & Richardson P.C.

(57) ABSTRACT

An air conditioner includes a purifying unit having at least one filter; a sensor unit including an air quality sensor; and a controller configured to: calculate a filter contamination level based on (i) data regarding indoor air quality measured by the air quality sensor during an operation of the air conditioner, and (ii) an operating time of the air conditioner; combine the calculated filter contamination level with a pre-stored filter contamination level to obtain a combined filter contamination level; and based on the combined filter contamination level satisfying at least one filter replacement condition, output filter replacement indicator information.

19 Claims, 13 Drawing Sheets

(a)

(b)

(a)

(b)

ARTIFICIAL INTELLIGENCE AIR CONDITIONER AND CONTROL METHOD THEREOF

CROSS-REFERENCE TO RELATED APPLICATION

This application claims the benefit of an earlier filing date and right of priority to Korean Patent Application No. 10-2017-0155774, filed on Nov. 21, 2017 in the Korean Intellectual Property Office, the disclosure of which is incorporated herein by reference.

TECHNICAL FIELD

The present disclosure relates to an air conditioner and a control method thereof.

BACKGROUND

Air conditioners are appliances that are designed to suck in air, change a temperature, moisture, or cleanness of the air, and then discharge the air to an outside. An air conditioner typically includes a compressor for compressing a refrigerant, a condenser for condensing the compressed refrigerant, an expansion valve for expanding the condensed refrigerant, and an evaporator for thermally exchanging the expanded refrigerant with indoor air. As such, an air conditioner performs a function of adjusting an indoor temperature.

An air conditioner may include a cooler or heater for changing indoor temperature, a humidifier or dehumidifier for changing indoor humidity, and an air purifier for changing indoor air cleanness.

SUMMARY

Implementations are disclosed herein that enable an air conditioner that adaptively learns a filter contamination level during an operation of the air conditioner.

In one aspect, an air conditioner includes a purifying unit including at least one filter; a sensor unit including an air quality sensor; and a controller configured to: calculate a filter contamination level based on (i) data regarding indoor air quality measured by the air quality sensor during an operation of the air conditioner, and (ii) an operating time of the air conditioner; combine the calculated filter contamination level with a pre-stored filter contamination level to obtain a combined filter contamination level; and based on the combined filter contamination level satisfying at least one filter replacement condition, output filter replacement indicator information.

In some implementations, the controller is further configured to: determine a quantity of introduced air based on (i) a quantity of airflow during the operation of the air conditioner, and (ii) the operating time of the air conditioner; determine an air pollution level based on the data regarding indoor air quality measured by the air quality sensor during the operation of the air conditioner; and calculate the filter contamination level further based on the quantity of introduced air and the air pollution level.

In some implementations, the purifying unit includes a filter part in which a plurality of filters is stacked.

In some implementations, the at least one filter replacement condition includes a plurality of filter replacement conditions that each corresponds to a respective filter among the plurality of filters, and the controller is further configured to determine whether the combined filter contamination level satisfies the plurality of filter replacement conditions that are set for the plurality of filters.

In some implementations, the air conditioner further includes an audio output unit, and the controller is further configured to output, through the audio output unit, the filter replacement indicator information as a voice guidance message.

In some implementations, the air conditioner further includes a camera and a display unit, and the controller is further configured to: detect, through the camera, a proximity of a user; and display, through the display unit, the filter replacement indicator information based on a detection of the proximity of the user.

In some implementations, the air conditioner further includes a communication unit, and the controller is further configured to transmit, through the communication unit, the filter replacement indicator information to a different electronic device.

In some implementations, the controller is configured to combine the calculated filter contamination level with the pre-stored filter contamination level by adding the calculated filter contamination level to the pre-stored filter contamination level.

In some implementations, the controller is configured to calculate the filter contamination level based on a weighted combination of (i) the data regarding indoor air quality measured by the air quality sensor during the operation of the air conditioner, and (ii) the operating time of the air conditioner.

In some implementations, the controller is further configured to determine the pre-stored filter contamination level based on past operations of the air conditioner.

In another aspect, a method is disclosed of controlling an air conditioner including one more filters, the method including: measuring, through an air quality sensor, indoor air quality during an operation of the air conditioner; calculating a filter contamination level based on (i) data measured by the air quality sensor during the operation of the air conditioner, and (ii) an operating time of the air conditioner; combining the calculated filter contamination level with a pre-stored filter contamination level to obtain a combined filter contamination level; and based on the combined filter contamination level satisfying at least one filter replacement condition, outputting filter replacement indicator information.

In some implementations, calculating the filter contamination level includes: determining a quantity of introduced air based on (i) a quantity of airflow during the operation of the air conditioner, and (ii) the operating time of the air conditioner; determining an air pollution level based on the data measured by the air quality sensor during the operation of the air conditioner; and calculating the filter contamination level further based on the quantity of the introduced air and the air pollution level.

In some implementations, the at least one filter replacement condition is set for each type of one or more filters of an air purifying unit of the air conditioner.

In some implementations, outputting the filter replacement indicator information includes (i) displaying the filter replacement indicator information on a display unit, or (ii) outputting the filter replacement indicator information as a voice guidance message through an audio output unit.

In some implementations, outputting the filter replacement indicator information includes: based on a detection of a proximity of a user, (i) displaying the filter replacement indicator information on a display unit, or (ii) outputting the filter replacement indicator information as a voice guidance message through an audio output unit.

In some implementations, the method further includes transmitting, through a communication unit, the filter replacement indicator information to a different electronic device.

In some implementations, combining the calculated filter contamination level with the pre-stored filter contamination level includes: adding the calculated filter contamination level to the pre-stored filter contamination level.

In some implementations, calculating the filter contamination level is based on a weighted combination of (i) the data regarding indoor air quality measured by the air quality sensor during the operation of the air conditioner, and (ii) the operating time of the air conditioner.

In some implementations, the method further includes determining the pre-stored filter contamination level based on past operations of the air conditioner.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
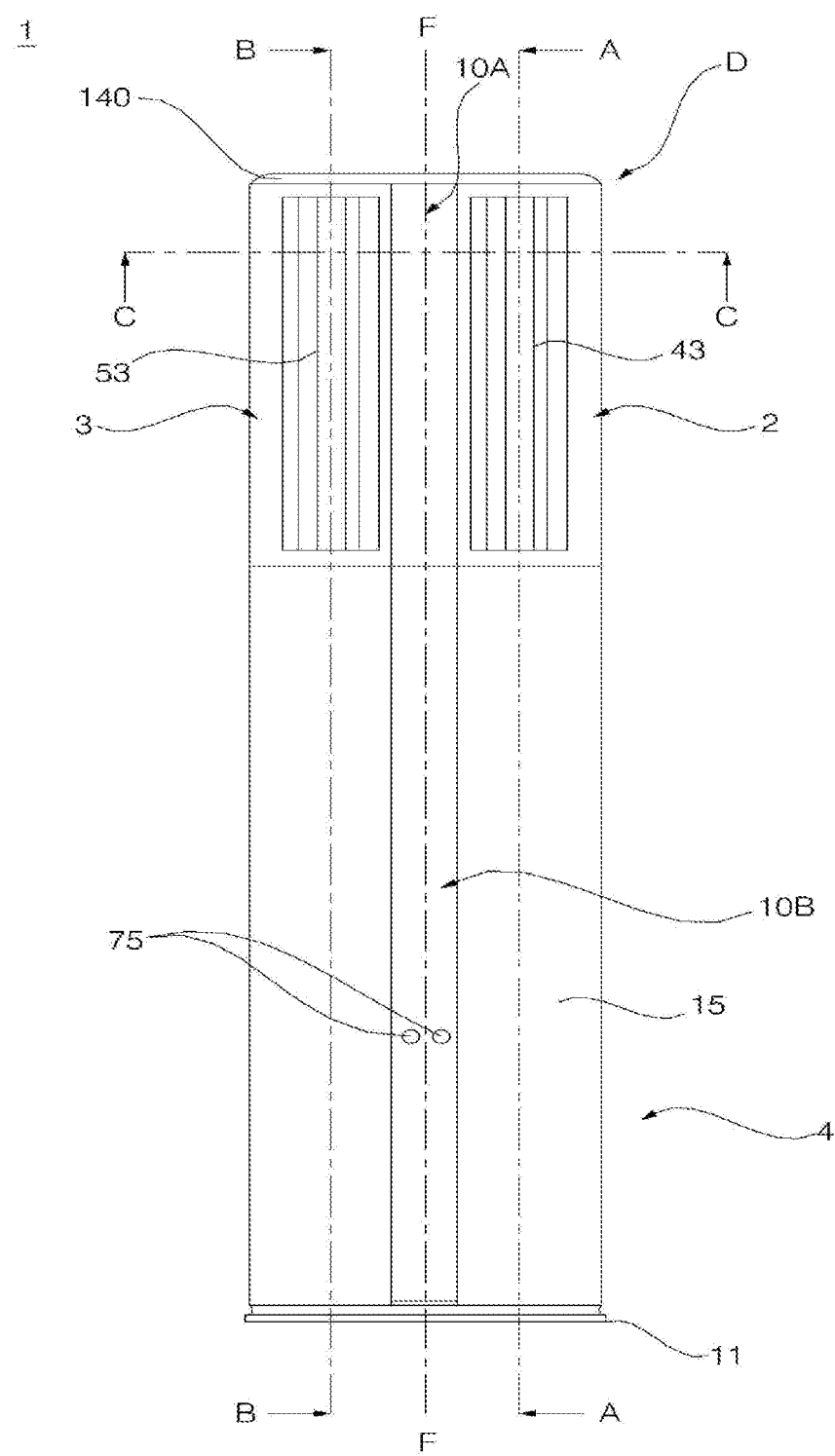
FIG. 1 is a front view illustrating an air conditioner according to an implementation of the present disclosure.

The present disclosure relates to an air conditioner and a control method thereof, and more particularly to an air conditioner configured to provide an air purifying function and a method thereof.

An air conditioner may be configured to provide a variety of functions such as cooling, heating, humidification, dehumidification, and air purification. However, it some scenarios, it may be difficult for a user to effectively and efficiently use the various functions of the air conditioner.

For example, air purification performance of an air conditioner is considerably influenced by management of a filter. However, it is often difficult for a user to manage and replace the filter.

To overcome such difficulties, some air conditioner manufacturers provide guidance for users to replace filters in a predetermined cycle, such as every 6 months or 12 months. However, such guidance is often without consideration of the specific use environment in which the air conditioner is actually being used.

Replacing a filter in a predetermined cycle without consideration of the actual use environment may result in various problems. For example, in scenarios where an air conditioner is used in a contaminated environment, filter performance may be degraded faster than expected, and, if a filter is not replaced, poor-quality air may be discharged. Conversely, in scenarios where an air conditioner is used in a clean environment, a filter may be replaced earlier than expected, which may be economically inefficient.

Furthermore, in some air conditioning systems, a filter replacement time may be estimated based on the premise that filter contamination leads to increasing load to a fan. However, the difficulty with such an approach is that changes in load (e.g., current) of a fan may happen for different reasons other than a contaminated filter. Thus, determination of a filter replacement time based on changing load to a fan may be less accurate in some scenarios.

The present disclosure has been made in view of the above problems, and it is one object of the present disclosure to provide an air conditioner configured to adaptively determine a filter replacement cycle in consideration of an actual use environment of the air conditioner and to provide filter replacement-related information to a user, thereby enhancing user convenience. The air conditioner according to implementations of the present disclosure is able to adaptively learn when a filter should be replaced based on actual operation of the air conditioner.

In some scenarios, implementations of the present disclosure may be one or more effects as follows. According to at least one of implementations of the present disclosure, as a proper filter replacement cycle is determined in consideration of the use environment and filter replacement-related information is provided to a user, user convenience may be enhanced.

In addition, according to at least one of implementations of the present disclosure, a high-quality air purifying function may be provided.

In addition, according to at least one of implementations of the present disclosure, as a voice guidance is provided to allow even an unskillful user to easily use the air conditioner, user convenience may be enhanced.

Effects of the present disclosure should not be limited to the aforementioned effects and other unmentioned effects will be clearly understood by those skilled in the art from the claims.

Figure 2:
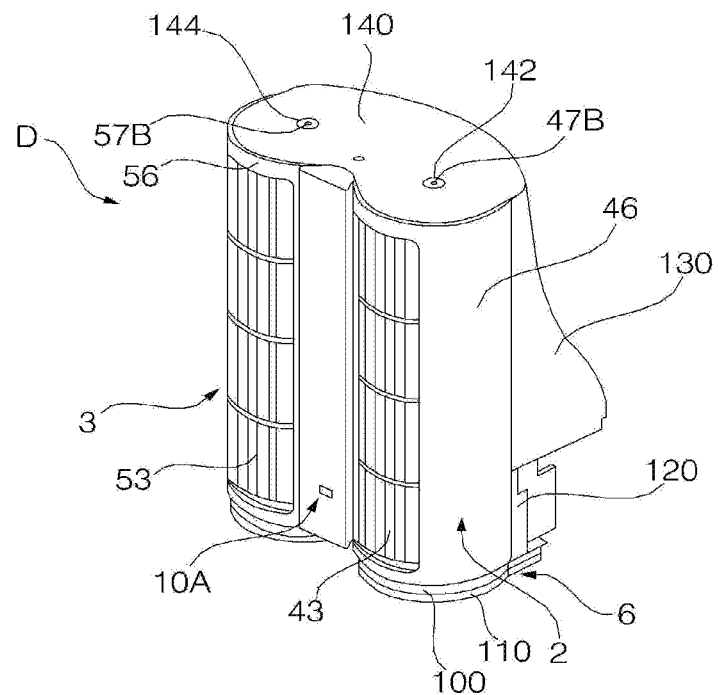
FIG. 2 is a perspective view illustrating an example in which an air discharging assembly and a blower of an air conditioner are separated from each other, according to an implementation of the present disclosure.
Figure 2:
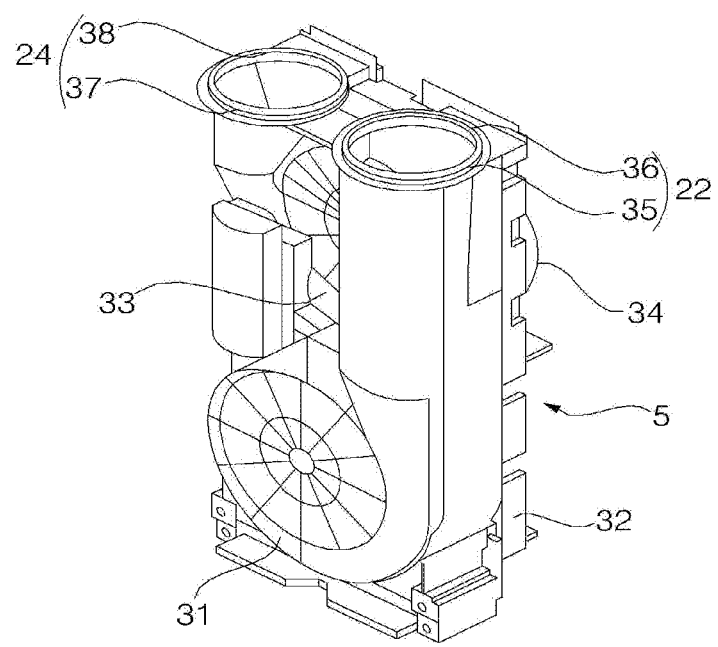

FIG. 1 is a front view illustrating an air conditioner according to an implementation of the present disclosure. FIG. 2 is a perspective view illustrating an example in which an air discharging assembly and a blower of an air conditioner are separated from each other, according to an implementation of the present disclosure.

Figure 3:
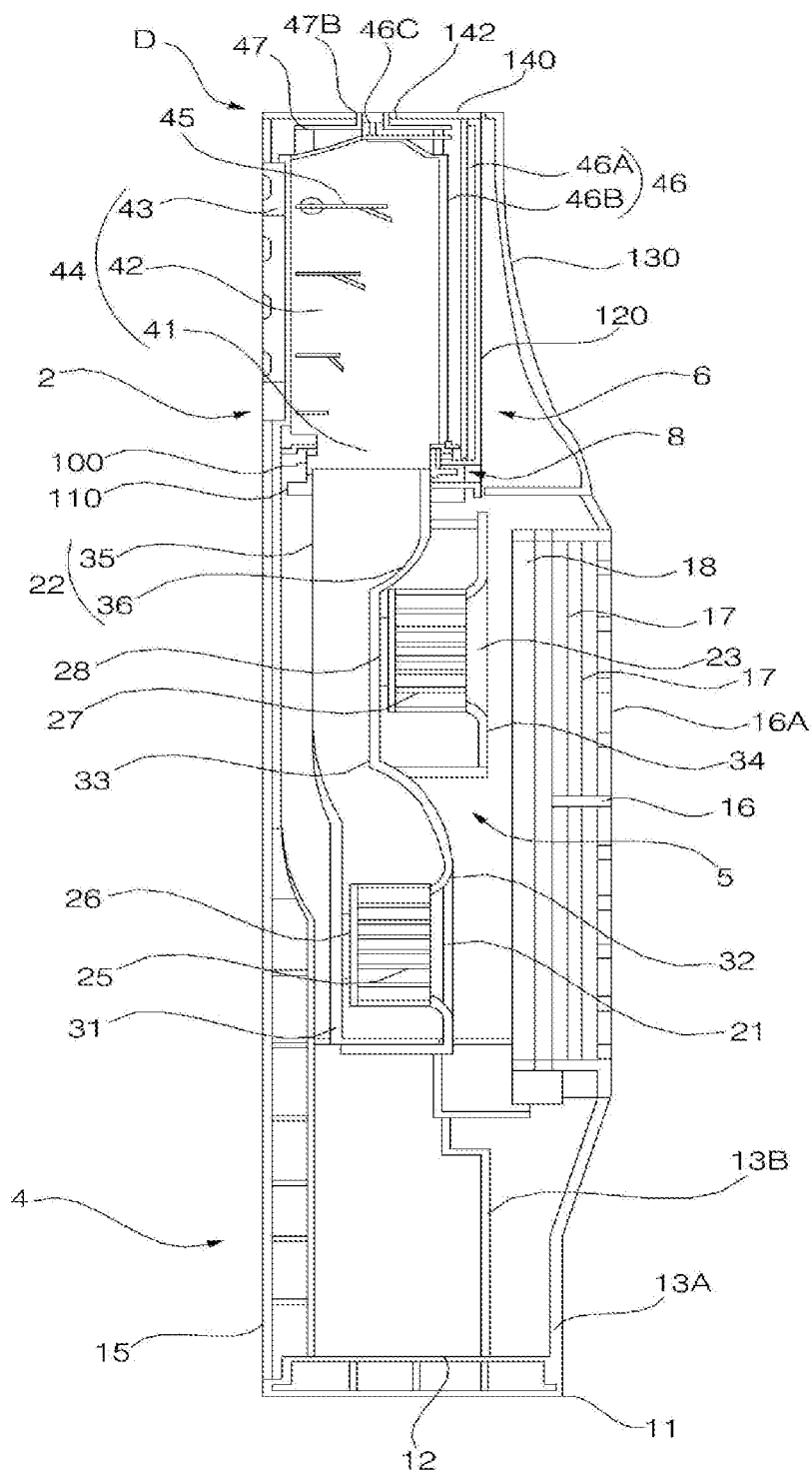
FIG. 3 is a cross-sectional view taken along line A-A of FIG. 1.
Figure 4:
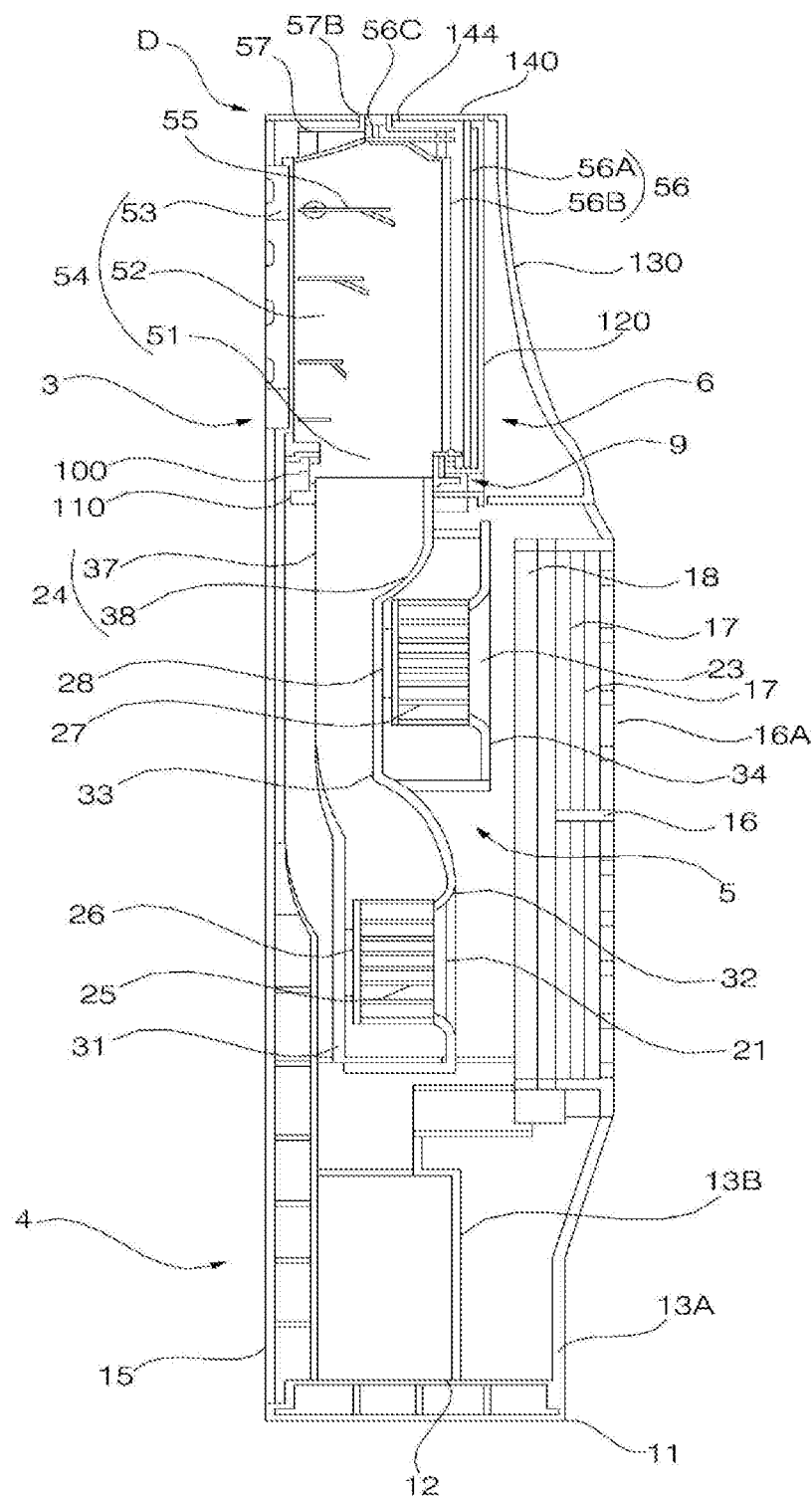
FIG. 4 is a cross-sectional view taken along line B-B of FIG. 1.
Figure 5:
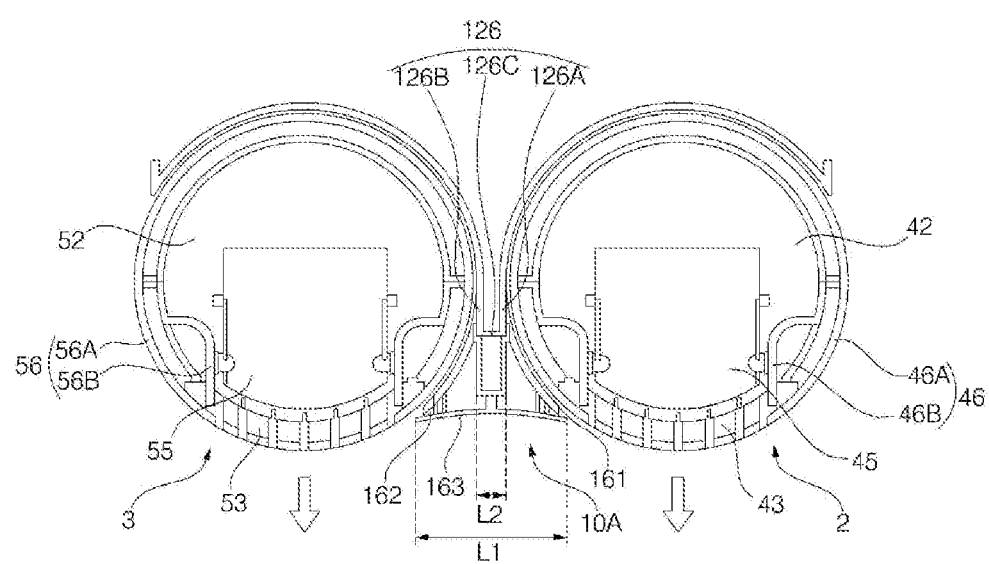
FIG. 5 is a cross-sectional view taken along line C-C of FIG. 1.
Figure 6:
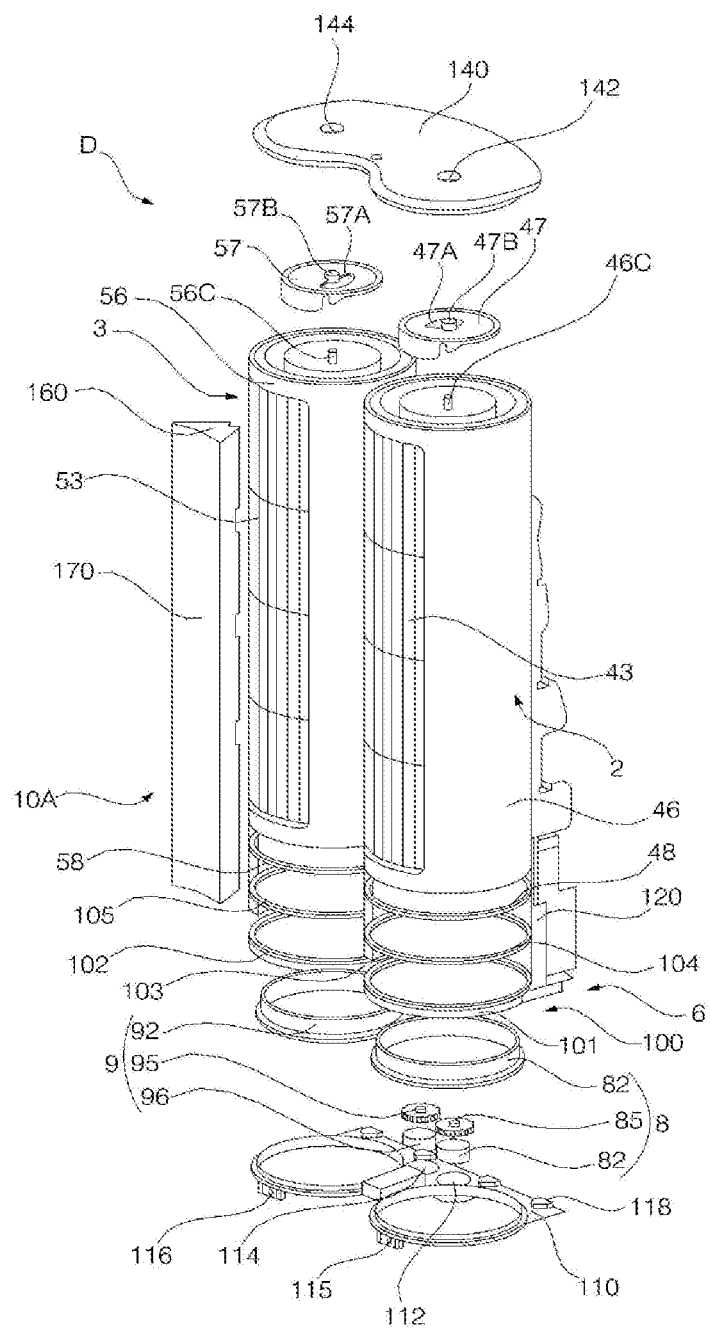
FIG. 6 is an exploded perspective view illustrating an air discharging unit and an air discharging unit holder of an air conditioner according to an implementation of the present disclosure.

FIG. 3 is a cross-sectional view taken along line A-A of FIG. 1. FIG. 4 is a cross-sectional view taken along line B-B of FIG. 1. FIG. 5 is a cross-sectional view taken along line C-C of FIG. 1. FIG. 6 is an exploded perspective view illustrating an air discharging unit and an air discharging unit holder of an air conditioner according to an implementation of the present disclosure.

Figure 7:
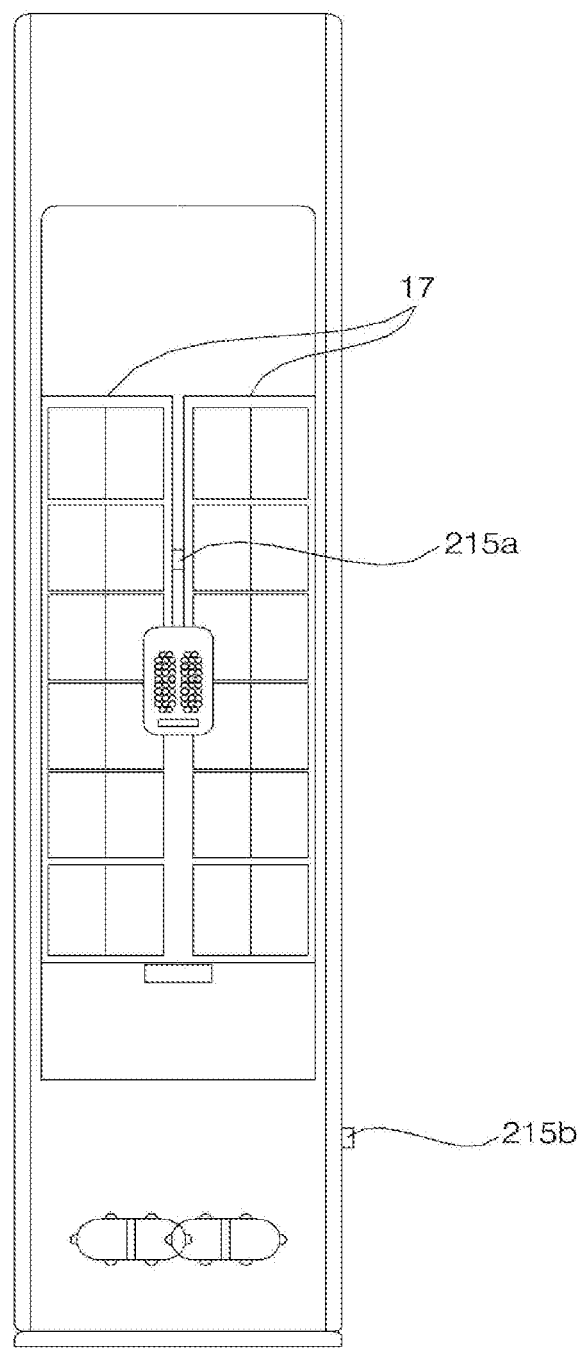
FIG. 7 is a rear view of an air conditioner according to an implementation of the present disclosure.

FIG. 7 is a rear view of an air conditioner according to an implementation of the present disclosure.

Referring to FIGS. 1 to 6, an air conditioner 1 may include a pair of air discharging units 2 and 3, an air discharging unit holder 6 supporting the pair of air discharging units 2 and 3 to space them apart from each other, and a display assembly 10 positioned between the pair of air discharging units 2 and 3.

The pair of air discharging units 2 and 3 may be disposed to be spaced apart from each other in a horizontal direction by the air discharging unit holder 6, and the display assembly 10 may be disposed long in an up and down direction between the pair of air discharging units 2 and 3. In some implementations, the display assembly 10 may block the gap between the pair of air discharging units 2 and 3 so that the pair of air discharging units 2 and 3 are not viewed from the front of the air conditioner.

The pair of air discharging units 2 and 3, the air discharging unit holder 6, and the display assembly 10 may form an air discharging assembly D for discharging the air air-conditioned by the air conditioner to the outside.

The air discharging assembly D may be installed in an air purifier having a blower 5 and a purifying unit 17, and the air purified by the purifying unit 17 may be distributively discharged to the outside through the pair of air discharging units 2 and 3. In this scenario, the air conditioner may be an air purifier for purifying indoor air.

Here, the purifying unit 17 may be implemented by various techniques such as, for example, a filter filtering foreign materials out of air, an electric dust collector collecting dust or other foreign materials by electrification, a water screen filter collecting foreign materials and absorbing moisture from air passing therethrough, or an ion generator generating ions in the air.

The air discharging assembly D may be installed in a cooler, heater, or dehumidifier having the blower 5 and the heat exchanger 18, and the air heat-exchanged with the heat exchanger 18 may be distributively discharged through the pair of air discharging units 2 and 3 to the outside. In this scenario, the air conditioner may be a cooler, heater, or dehumidifier that varies indoor temperature or moisture.

The air conditioner may include a body unit, the air discharging assembly D, and a connecting duct connecting the body unit with the air discharging assembly D, and at least one of the heat exchanger 18 or the purifying unit 17 or the blower 5 may be installed in the body unit. In this scenario, the air discharging assembly D may be installed, spaced apart from the body unit, and the air supplied from the body unit through the connecting duct may flow to the pair of air discharging units 2 and 3 and may be then discharged to the outside of the pair of air discharging units 2 and 3.

The pair of air discharging units 2 and 3 may guide the air blown by the blower 5 to the outside. The pair of air discharging units 2 and 3 may distributively discharge the air coming from the blower 5 to the outside, with the air discharging units 2 and 3 disposed in parallel with each other by the air discharging unit holder 6.

The pair of air discharging units 2 and 3 may have the same structure and different positions. Each of the pair of air discharging units 2 and 3 may have an air inlet through which air is introduced. Each of the pair of air discharging units 2 and 3 may have an air outlet through which air is discharged. Each of the pair of air discharging units 2 and 3 may have an internal flow path therein, which guides the air introduced through the air inlet to the air outlet.

Each of the pair of air discharging units 2 and 3 may have an air outlet at a portion of a circumference among an upper portion, lower portion, and circumference thereof. Each of the pair of air discharging units 2 and 3 may have an air inlet through which air is introduced, in at least one of the upper portion, lower portion, or circumference thereof.

In scenarios where the air inlet is formed at the lower portion of each of the pair of air discharging units 2 and 3, the air blown by the blower 5 may be introduced through the lower portion of the pair of air discharging units 2 and 3 into the internal flow path and may be discharged to the outside through the air outlet formed at the portion of the circumference of each of the pair of air discharging units 2 and 3.

In scenarios where the air inlet is formed at the upper portion of each of the pair of air discharging units 2 and 3, the air blown by the blower 5 may be introduced through the upper portion of the pair of air discharging units 2 and 3 into the internal flow path and may be discharged to the outside through the air outlet formed at the portion of the circumference of each of the pair of air discharging units 2 and 3.

In scenarios where the air inlet is formed at the circumference of each of the pair of air discharging units 2 and 3, the air inlet may be formed at a portion of the circumference which is spaced apart from the air outlet. In this scenario, the pair of air discharging units 2 and 3 may be shaped so that their top and bottom surfaces are closed. The air blown by the blower 5 may be introduced through the air inlet formed at the circumference of each of the pair of air discharging units 2 and 3 into the internal flow path and may be discharged to the outside through the air outlet formed at the circumference of each of the pair of air discharging units 2 and 3.

One of the pair of air discharging units 2 and 3 may be a left air discharging unit that is positioned at the left side of the central line F of the air conditioner, and the other of the pair of air discharging units 2 and 3 may be a right air discharging unit that is positioned at the right side of the central line F of the air conditioner.

The left air discharging unit may discharge air from the left side of the air conditioner to the front side of the air conditioner, and the right air discharging unit may discharge air from the right side of the air conditioner to the front side of the air conditioner.

The left air discharging unit and the right air discharging unit may discharge air in opposite directions thereof. The left air discharging unit may discharge air in a left direction of the air conditioner, and the right air discharging unit may discharge air in a right direction of the air conditioner.

The left air discharging unit may discharge air in a first inclined direction that is a left and front direction of the air conditioner, and the right air discharging unit may discharge air in a second inclined direction that is a right and front direction of the air conditioner.

Further, the left air discharging unit may discharge air in a front direction of the air conditioner, and the right air discharging unit may discharge air in the front direction of the air conditioner. In this scenario, the left air discharging unit and the right air discharging unit may discharge air in parallel directions, and two front air flows may be created at the front of the air conditioner.

The air conditioner may further include a casing 4 forming an outer appearance. The air conditioner may further include the blower 5 blowing air to the pair of air discharging units 2 and 3.

In some implementations, the air conditioner may be configured as a stand-alone air conditioner that is installed on the floor of a room or as a wall-mounted air conditioner that is hung and installed onto a wall.

Hereinafter, a stand-alone air conditioner is described as an example.

The casing 4 may include a base 11. The base 11 may have a stereoscopic shape with its front and top surfaces opened. The base 11 may include a lower frame 12 and a rear plate part 13 formed on the lower frame 12. The rear plate part 13 may be vertically formed at a rear portion of the lower frame 12.

The casing 4 may further include a front cover 15. The front cover 15 may be provided to cover the front side of the blower 5. The bottom of the front cover 15 may be mounted on the lower frame 12 of the base 11. The front cover 15 may be provided at the lower frame 12 to shield a portion of the lower frame 12.

The casing 4 may include a sucking body 16 through which air is sucked into the inside of the air conditioner. The sucking body 16 may be provided at the top of the base 11. The sucking body 16 may be provided at the top of the rear plate part 13 of the base 11. The sucking body 16 may be provided long in the up and down direction at the top of the rear plate part 13 of the base 11. The sucking body 16 may include an air inlet 16A through which air is sucked from outside of the air conditioner into the inside of the air conditioner.

The air conditioner may include the purifying unit 17 for purifying air. The purifying unit 17 may be installed in the sucking body 16, and air introduced into the air conditioner may be purified by the purifying unit 17. The purifying unit 17 may include at least one of a filter foreign materials out of air passing therethrough, an electric dust collector collecting dust from the air by electrification, and an ion generator generating ions in the air.

The air conditioner may include a heat exchanger 18 provided inside the casing 4 to thermally exchange air with a refrigerant. The heat exchanger 18 may be positioned between the sucking body 16 and the blower 5 in an air flowing direction.

The blower 5 may be installed inside the casing 4. The blower 5 may be installed to face a portion of the heat exchanger 18. The blower 5 may be positioned at a front side of the heat exchanger 18. The blower 5 may suck air from a rear side thereof and blow the air in an upper direction or lower direction.

The blower 5 may include a first air discharging part 22 for blowing air to the inside of one 2 of the plurality of air discharging units 2 and 3, and a second air discharging part 24 for blowing the air to the inside of the other 3 of the plurality of air discharging units 2 and 3. The blower 5 may distributively discharge the air sucked through a sucking part to the first air discharging part 22 and the second air discharging part 24.

The blower 5 may include a plurality of sucking parts 21 and 23. In scenarios where the blower 5 includes the plurality of sucking parts 21 and 23, the air sucked through a first sucking part 21 of the plurality of sucking parts 21 and 23 may be blown to the first air discharging part 22, and the air sucked through a second sucking part 23 of the plurality of sucking parts 21 and 23 may be blown to the second air discharging part 24.

In some implementations, in scenarios where the blower includes the plurality of sucking parts 21 and 23, the blower 5 may include a first air blowing flow path through which the air sucked through the first sucking part 21 is discharged to the first air discharging part 22, and a second air blowing flow path through which the air sucked through the second sucking part 23 is discharged to the second air discharging part 24.

Furthermore, in scenarios where the blower 5 includes the plurality of sucking parts 21 and 23, the blower 5 may include a first blower 25 rotated in the first air blowing flow path, and a first fan motor 26 for rotating the first blower 25, and the blower 5 may further include a second blower 27 rotated in the second air blowing flow path, and a second fan motor 28 for rotating the second blower 27.

The blower 5 may include a first fan housing 31 having the first fan motor 26 mounted therein and surrounding the first blower 25, and a first orifice 32 coupled with the first fan housing 31 and having the first sucking part 21 for guiding air to the first blower 25.

The blower 5 may include a second fan housing 33 having the second fan motor 28 mounted therein and surrounding the second blower 27, and a second orifice 34 coupled with the second fan housing 33 and having the second sucking part 23 for guiding air to the second blower 27.

The second fan housing 33 may be formed at an upper side of the first orifice 32 integrally with the first orifice 32. The second orifice 34 may be coupled with the second fan housing 33 at a rear side of the second fan housing 33, and the first fan housing 31 may be coupled with the first orifice 32 at a front side of the first orifice 32.

The blower 5 may be positioned under the air discharging assembly D to blow air to the air discharging assembly D. The blower 5 may be positioned above the air discharging assembly D to blow air to the air discharging assembly D. The blower 5 may be positioned behind the air discharging assembly D to blow air to the air discharging assembly D.

In scenarios where the blower 5 is positioned under the air discharging assembly D, each of the first air discharging part 22 and the second air discharging part 24 may be positioned at an upper portion of the blower 5 and may discharge and guide air to an upward direction.

The first air discharging part 22 may be formed by the first fan housing 31 and the second fan housing 33 as shown in FIG. 3. The first fan housing 31 may include a first front duct part 35 with opened rear and top surfaces, which projects in the upward direction and is disposed at a front side of a portion of the second fan housing 33. The second fan housing 33 may include a first rear duct part 36 that is positioned at a rear side of the first front duct part 35.

In some implementations, the first rear duct part 36 has opened front and top surfaces and may be shaped to be recessed to the rearward in the second fan housing 33. The first front duct part 35 and the first rear duct part 36 may guide the air blown by the first blower 25 to the left air discharging unit. When the first fan housing 31 and the second fan housing 33 are coupled with each other such that the first front duct part 35 is positioned at a front side of the first rear duct part 36, the first front duct part 35 and the first rear duct part 36 may constitute a duct unit shaped as a hollow cylinder.

The second air discharging part 24 may be formed by the second fan housing 33 and the second orifice 34 as shown in FIG. 4. The second fan housing 33 may have the second front duct part 37 with opened rear and top surfaces, which projects in a forward direction and positions itself at a front side of a portion of the second orifice 34. The second orifice 34 may include a second rear duct part 38 that is positioned at a rear side of the second front duct part 37.

In some implementations, the second rear duct part 38 may have opened front and top surfaces. The second front duct part 37 and the second rear duct part 38 may guide the air blown by the second blower 27 to the right air discharging unit. When the second fan housing 33 and the second orifice 34 are coupled with each other such that the second front duct part 37 is positioned at a front side of the second rear duct part 38, the second front duct part 37 and the second rear duct part 38 may include a duct unit shaped as a hollow cylinder.

Hereinafter, described is an example in which an air inlet is formed at a lower portion of each of the pair of air discharging units 2 and 3 and an air outlet at a portion of a circumference thereof.

Of the pair of air discharging units 2 and 3, one air discharging unit 2 may include a first air inlet 41 through which the air blown by the blower 5 is introduced, a first internal flow path 42 for guiding the air having passed through the first air inlet 41, and a first air outlet 43 through which the air guided by the first internal flow path 42 is discharged to the outside. The first air inlet 41, the first internal flow path 42, and the first air outlet 43 may constitute the first air discharging flow path 44 of one air discharging unit 2 of the pair of air discharging units 2 and 3.

A first wind direction adjusting vane 45 may be disposed in one air discharging unit 2 of the pair of air discharging units 2 and 3 to adjust the direction of air passing through the first air discharging flow path 44. The first wind direction adjusting vane 45 may be rotatably disposed inside one air discharging unit 2 of the pair of air discharging units 2 and 3. The first wind direction adjusting vane 45 may be positioned at the first internal flow path 42, with its tip facing the first air outlet 43.

The first air inlet 41 may be formed at a lower portion of one air discharging unit 2 of the pair of air discharging units 2 and 3 to pass therethrough in upper and lower directions. The internal flow path 42 may be formed long in upper and lower directions inside one air discharging unit 2 of the pair of air discharging units 2 and 3. The first air outlet 43 may be formed on the circumference of one air discharging unit 2 of the pair of air discharging units 2 and 3.

In some implementations, one air discharging unit 2 of the pair of air discharging units 2 and 3 may be shaped such that its top surface is closed, and the first air outlet 43 may be formed at the circumference among the top plate part and the circumference of one air discharging unit 2 of the pair of air discharging units 2 and 3. The first air outlet 43 may be formed on the circumference of one air discharging unit 2 of the pair of air discharging units 2 and 3 to penetrating the same in a horizontal direction. The first air outlet 43 may be formed long in upper and lower directions on the circumference of one air discharging unit 2 of the pair of air discharging units 2 and 3.

In some implementations, the opened direction of the first air inlet 41 may be perpendicular with the opened direction of the first air outlet 43. After flowing through the first air inlet 41 to the inside of one air discharging unit 2 of the pair of air discharging units 2 and 3, the air changes its flow direction, and may be discharged through the first air outlet 43 in a horizontal direction.

One air discharging unit 2 of the pair of air discharging units 2 and 3 may be comprised of an assembly of a plurality of members. For example, one air discharging unit 2 of the pair of air discharging units 2 and 3 may include a first air discharging body 46 having a first air discharging flow path 44, a first top body 47 provided at an upper side of the first air discharging body 46, and a first lower ring 48 coupled with a lower portion of the first air discharging body 46.

The first air discharging body 46 may be shaped as a cylinder with a closed top surface and an opened bottom surface. The first air inlet 41, the first internal flow path 42, and the first air outlet 43 as shown in FIG. 3 may be formed in the first air discharging body 46, and the first air outlet 43 may be formed at a portion of the outer circumference of the first air discharging body 46.

In some implementations, the first wind direction adjusting vane 45 as shown in FIG. 3 may be rotatably disposed in the first air discharging body 46. The first air discharging body 46 may include a first wind direction adjusting motor for generating a dynamic force for rotating the first wind direction adjusting vane 45. The first wind direction adjusting motor may be connected with the first wind direction adjusting vane 45 directly or via a dynamic force transferring member such as a link.

The first air discharging body 46 may be constituted of an assembly of a plurality of members. The first air discharging body 46 may include a first outer body 46A for forming the outer appearance of the first air discharging body 46, and a first inner guide 46B provided inside the first outer body 46A. The first air discharging body 46 may have a first rotational protrusion 46C that projects forming the rotational center axis of one 2 of the pair of air discharging units 2 and 3.

In some implementations, the first outer body 46A may be shaped as a hollow cylinder. The first outer body 46A may be opened for its top and bottom and may have a space therein to accommodate the first inner guide 46B. The first outer body 46A may be formed such that a plurality of outer bodies each having an arc-shaped cross section is coupled into a hollow cylinder shape, and one of the plurality of outer bodies may have the first air outlet 43 where a first air discharging grill is formed.

In some implementations, the first inner guide 46B may be shaped as a hollow bucket with an opened bottom surface and a closed top surface. The first air inlet 41 may be formed at a lower portion of the first inner guide 46B, and the first internal flow path 42 may be formed inside the first inner guide 46B. The first wind direction adjusting vane 45 may be rotatably connected with the first inner guide 46B.

The first top body 47 may be an electric wire guide for guiding a first electric wire connected to the first wind direction adjusting motor, and the first top body 47 may have an electric wire through hole 47A through which the first electric wire passes.

The first top body 47 may be press fitted into an upper portion of the first air discharging body 46 or may be mounted to the upper portion of the first air discharging body 46 by way of a screw or other connecting members.

The first top body 47 may have a first boss part 47B that projects in an upward direction to surround the first rotational protrusion 46C. The first boss part 47B, together with the first rotational protrusion 46C, may constitute the rotational center axis of one 2 of the pair of air discharging units 2 and 3. The first boss part 47B may be positioned between the first rotational protrusion 46C and the first supporting part 142 of the top cover 140 and may be supported by the first supporting part 142. In other words, one 2 of the pair of air discharging units 2 and 3 may be rotatably kept in position at the top cover 140 by the first rotational protrusion 46C and the first boss part 47B.

The first lower ring 48 may be coupled with a lower portion of the first air discharging body 46 and may be rotated along with the first air discharging body 46. The first lower ring 48 may be coupled with the first air discharging body 46 by way of a screw or other connecting members. The first lower ring 48 may have a connecting member through hole through which a screw or other connecting member passes.

The first lower ring 48 may be seated in the lower body 100 and may rub against the lower body 100. The first lower ring 48 may be formed of metal to reinforce the strength of the first air discharging body 46 while preventing the first air discharging body 46 from being worn.

Of the pair of air discharging units 2 and 3, the other 3 may include a second air inlet 51 through which the air blown by the blower 5 is introduced, a second internal flow path 52 for guiding the air having passed through the second air inlet 51, and a second air outlet 53 through which the air guided by the second internal flow path 52 is discharged to the outside. The second air inlet 51, the second internal flow path 52, and the second air outlet 53 may constitute the second air discharging flow path 54 of the other 3 of the pair of air discharging units 2 and 3.

A second wind direction adjusting vane 55 may be disposed in the other 3 of the pair of air discharging units 2 and 3 to adjust the direction of air passing through the second air discharging flow path 54. The second wind direction adjusting vane 55 may be rotatably disposed inside the other 2 of the pair of air discharging units 2 and 3. The second wind direction adjusting vane 55 may be positioned at the second internal flow path 52, with its tip facing the second air outlet 53.

The second air inlet 51 may be formed at a lower portion of the other 3 of the pair of air discharging units 2 and 3 to penetrate the same in upper and lower directions. The second internal flow path 52 may be formed long in an up and down direction inside the other 3 of the pair of air discharging units 2 and 3. The second air outlet 53 may be formed on the circumference of the other 3 of the pair of air discharging units 2 and 3. The other 3 of the pair of air discharging units 2 and 3 may be shaped such that its top surface is closed, and the second air outlet 53 may be formed at the circumference among the top plate part and the periphery of the other 3 of the pair of air discharging units 2 and 3. The second air outlet 53 may be formed on the circumference of the other 3 of the pair of air discharging units 2 and 3 to penetrating the same in a horizontal direction. The second air outlet 53 may be formed at the circumference of the other 3 of the pair of air discharging units 2 and 3 to penetrate the same in an up and down direction. The opened direction of the second air inlet 51 may be perpendicular with the opened direction of the second air outlet 53. After flowing through the second air inlet 51 to the inside of the other 3 of the pair of air discharging units 2 and 3, the air changes its flow direction, and may be discharged through the second air outlet 53 in a horizontal direction.

The other 3 of the pair of air discharging units 2 and 3 may be constituted of an assembly of a plurality of members. The other 3 of the pair of air discharging units 2 and 3 may include a second air discharging body 56 having a second air discharging flow path 54, a second top body 57 provided at an upper side of the second air discharging body 56, and a second lower ring 58 coupled with a lower portion of the second air discharging body 56.

Like the first air discharging body 46, the second air discharging body 56 may be shaped as a cylinder with a closed top surface and an opened bottom surface. The second air inlet 51, the second internal flow path 52, and the second air outlet 53 as shown in FIG. 3 may be formed in the second air discharging body 56, and the second air outlet 53 may be formed at a portion of the circumference of the second air discharging body 56.

In some implementations, the second wind direction adjusting vane 55 may be rotatably disposed in the second air discharging body 56. The second air discharging body 56 may include a second wind direction adjusting motor for generating a dynamic force for rotating the second wind direction adjusting vane 55. The second wind direction adjusting motor may be connected with the second wind direction adjusting vane 55 directly or via a dynamic force transferring member such as a link.

The second air discharging body 56 may be comprised of an assembly of a plurality of members. The second air discharging body 56 may include a second outer body 56A for forming the outer appearance of the second air discharging body 56 and a second inner guide 56B provided inside the second outer body 56A. The second air discharging body 56 may have a second rotational protrusion 56C that projects forming the rotational center axis of the other 3 of the pair of air discharging units 2 and 3.

The second outer body 56A may be overall shaped as a hollow cylinder. The second outer body 56A may be opened for its top and bottom and may have a space therein to accommodate the second inner guide 56B. The second outer body 56A may be formed so that a plurality of outer bodies each having an arc-shaped cross section are coupled into a hollow cylinder shape, and one of the plurality of outer bodies may have the second air outlet 53 where a second air discharging grill is formed.

The second inner guide 56B may be shaped as a hollow bucket with an opened bottom surface and a closed top surface. The second air inlet 51 may be formed at a lower portion of the second inner guide 56B, and the second internal flow path 52 may be formed inside the second inner guide 56B. The second wind direction adjusting vane 55 may be rotatably connected with the second inner guide 56B.

The second top body 57 may be an electric wire guide for guiding a second electric wire connected to the second wind direction adjusting motor, and the second top body 57 may have an electric wire through hole 57A through which the second electric wire passes.

The second top body 57 may be press fitted into an upper portion of the second air discharging body 56 or may be mounted to the upper portion of the second air discharging body 56 by way of a screw or other connecting members.

The second top body 57 may have a second boss part 57B that projects in an upper direction to surround the second rotational protrusion 56C. The second boss part 57B, together with the second rotational protrusion 56C, may constitute the rotational center axis of the other 3 of the pair of air discharging units 2 and 3. The second boss part 57B may be positioned between the second rotational protrusion 56C and the second supporting part 144 of the top cover 140 and may be supported by the second supporting part 144. In other words, the second air discharging unit 3 may be rotatably kept in position at the top cover 140 by the second rotational protrusion 56C and the second boss part 57B.

The second lower ring 58 may be coupled with a lower portion of the second air discharging body 56 and may be rotated along with the second air discharging body 56. The second lower ring 58 may be coupled with the second air discharging body 56 by way of a screw or other connecting members. The second lower ring 58 may have a connecting member through hole through which a screw or other connecting member passes.

The second lower ring 58 may be seated in the lower body 100 and may rub against the lower body 100. The second lower ring 58 may be formed of metal to reinforce the strength of the second air discharging body 56 while preventing the second air discharging body 56 from being worn.

The air discharging unit holder 6 may include the lower body 100 where the pair of air discharging units 2 and 3 are mounted. At least a portion of the air discharging unit holder 6 may include a rear body 120 positioned behind the pair of air discharging units 2 and 3. The air discharging unit holder 6 may include a top cover 140 positioned at an upper side of the pair of air discharging units 2 and 3.

The rear body 120 is disposed at a lower portion of the top cover 140, and the overall air discharging unit holder 6 may be shaped as an overturned "L."

The rear body 120 is disposed at an upper portion of the lower body 100, and the overall air discharging unit holder 6 may be shaped as the letter "L."

The top cover 140 and the lower body 100 may be spaced apart from each other in upper and lower directions, and the rear body 120 may be disposed between the top cover 140 and the lower body 100, and thus, the overall air discharging unit holder 6 may be shaped as a lying 'U."

The lower body 100 may rotatably support the lower portion of each of the pair of air discharging units 2 and 3. The pair of air discharging units 2 and 3 may be seated on the lower body 100, spaced apart from the lower body 100, and the load of the pair of air discharging units 2 and 3 may be distributed on the lower body 100. The lower body 100 may form a lower portion of the air discharging unit holder 6.

The lower body 100 may include a ring-shaped first seating part 101, a ring-shaped second seating part 102, and a lower plate part 103 connecting the first seating part 101 with the second seating part 102.

One 2 of the pair of air discharging units 2 and 3 may be rotatably seated on the first seating part 101, and it may be rotatably seated on a first fixing ring 104 that is to be described below. The other 3 of the pair of air discharging units 3 and 3 may be rotatably seated on the second seating part 102, and it may be rotatably seated on a second fixing ring 105 that is to be described below.

The lower plate part 103 may be integrally formed with the first seating part 101 and the second seating part 102. The lower plate part 103 may be positioned between the first seating part 101 and the second seating part 102, at a rear side of the first seating part 101, and at a rear side of the second seating part 102.

The lower body 100 may be comprised of an assembly of a plurality of members, and may further include the first fixing ring 104 that is installed in the first seating part 101 and where one 2 of the pair of air discharging units 2 and 3 is rotatably seated and the second fixing ring 105 that is installed in the second seating part 102 and where the other 3 of the pair of air discharging units 2 and 3 is rotatably seated.

The first fixing ring 104 and the first lower ring 48 may be formed of metal, and the first lower ring 48 may be seated on the first fixing ring 104.

The second fixing ring 105 and the second lower ring 58 may be formed of metal, and the second lower ring 58 may be seated on the second fixing ring 105.

The air discharging unit holder 6 may further include a lower cover 110 installed in the lower body 100. The lower cover 110 may be coupled to a lower portion of the lower body 100. The lower cover 110 may be coupled to an upper portion of the blower 5. The lower cover 110 may function as an air discharging unit holder mounter for mounting the air discharging unit holder 6 to the blower 5.

The air conditioner may include an air discharging unit rotating mechanism rotating the pair of air discharging units 2 and 3. The air discharging unit rotating mechanism may include a first air discharging unit rotating mechanism 8 rotating one 2 of the pair of air discharging units 2 and 3 and a second air discharging unit rotating mechanism 9 rotating the other 3 of the pair of air discharging units 2 and 3.

The first air discharging unit rotating mechanism 8 may include a first gear 82 disposed in one 2 of the pair of air discharging units 2 and 3, a first driving gear 85 engaged with the first gear 82 to rotate the first gear 82, and a first motor 86 rotating the first driving gear 85.

The first gear 82 may be a first slave gear that is rotated by the first driving gear 85. The first gear 82 may have a ring-shaped body. The ring-shaped body may have, on its outer periphery, gear teeth engaged with the first driving gear 85. The ring-shaped body may be coupled with at least one of the first lower ring 48 and the first air discharging body 46 of one 2 of the pair of air discharging units 2 and 3 by way of a screw or other connecting member. The ring-shaped body may have a connecting member through hole through which a screw or other connecting member passes.

The first driving gear 85 may be formed to be smaller in size than the first gear 82. The first driving gear 85 may be positioned adjacent to the first gear 82, and the first driving gear 85 may rotate the first gear 82 at a position adjacent to the first gear 82.

The first motor 86 may be installed in the lower cover 110.

The second air discharging unit rotating mechanism 9 may include a second gear 92 disposed in the other 3 of the pair of air discharging units 2 and 3, a second driving gear 95 engaged with the second gear 92 to rotate the second gear 92, and a second motor 96 rotating the second driving gear 95.

The second gear 92 may be a second slave gear that is rotated by the second driving gear 95. The second gear 92 may have a ring-shaped body. The ring-shaped body may have, on its outer periphery, gear teeth engaged with the second driving gear 95. The ring-shaped body may be coupled with at least one of the second lower ring 58 and the second air discharging body 56 of the second air discharging unit 3 by way of a screw or other connecting member. The ring-shaped body may have a connecting member through hole through which a screw or other connecting member passes.

The second driving gear 95 may be formed to be smaller in size than the second gear 92. The second driving gear 95 may be positioned adjacent to the second gear 92, and the second driving gear 95 may rotate the second gear 92 at a position adjacent to the second gear 92.

The second motor 96 may be installed in the lower cover 110.

The lower cover 110 may have a first motor accommodating part 112 where the first motor 86 is inserted and accommodated and a second motor accommodating part 114 where the second motor 96 is inserted and accommodated. The lower cover 110 may include a plurality of couplers 115 and 116 coupled with the blower 5 by way of a screw or other connecting member. The lower cover 110 may have at least one lower body coupler 118 coupled to the lower body 100 by way of a screw or other connecting member.

The rear body 120 may be formed perpendicular to the lower body 100 and may accommodate at least a portion of each of the pair of air discharging units 2 and 3. The rear body 120 may rotatably accommodate the pair of air discharging units 2 and 3. The rear body 120 may be integrally formed with the lower body 100 at a rear side of the lower body 100. The rear body 120 may be formed separately from the lower body 100 and may be coupled with a rear portion of the lower body by way of a connecting member such as screws or hooks. The rear body 120 may be formed to be larger in size than the gap between the pair of air discharging units 2 and 3. The rear body 120 may shield the gap between the pair of air discharging units 2 and 3 at a rear side of the pair of air discharging units 2 and 3.

The rear body 120 may have a protrusion 126 projecting toward the gap between the pair of air discharging units 2 and 3. The protrusion 126 may include a first side part 126A facing one 2 of the pair of air discharging units 2 and 3 and a second side part 126B facing the other 3 of the pair of air discharging units 2 and 3. The protrusion 126 may further include a front plate part 126C connecting an end of the first side part 126A with an end of the second side part 126B. The protrusion 126 may be shaped so that its left and right side surfaces are opened and its rear surface opened.

The air conditioner may further include a back cover 130 coupled to the rear body 120. The back cover 130 may cover the back surface of the rear body 120 to protect the rear body 120. The back cover 130 may be positioned at an upper side of the sucking body 16 to cover the upper side of the sucking body 16.

The top cover 140 may cover the gap between the pair of air discharging units 2 and 3 at an upper side of the pair of air discharging units 2 and 3.

The top cover 140 may cover the gap between an upper portion of the display assembly 10 and an upper portion of the protrusion 126.

The top cover 140 may be coupled to the rear body 120. The top cover 140 may keep an upper portion of the pair of air discharging units 2 and 3 in position.

The top cover 140 may have a first supporting part 142 rotatably supporting an upper portion of one 2 of the pair of air discharging units 2 and 3 and a second supporting part 144 rotatably supporting an upper portion of the other 3 of the pair of air discharging units 2 and 3. The first supporting part 142 may be a supporting hole rotatably supporting the rotational center axis of one of the pair of air discharging units 2 and 3. The second supporting part 144 may be a supporting hole rotatably supporting the rotational center axis of the other of the pair of air discharging units 2 and 3. The top cover 140 may be connected to an upper portion of the rear body 120 by way of a connecting member such as a screw or a hooking member such as a hook.

A side surface 161 of the display assembly 10 may face an outer periphery of one 2 of the pair of air discharging units 2 and 3, and the other side surface 162 of the display assembly 10 may face an outer periphery of the other 3 of the pair of air discharging units 2 and 3. A front surface 163 of the display assembly 10 may be exposed to the outside.

The display assembly 10 may be comprised of an assembly of a plurality of members. The display assembly 10 may function as a control panel for manipulating the air conditioner and as a display for displaying information on the air conditioner. The display assembly 10 may function as a display-cum-control panel.

The display assembly 10 may be smaller in size than each of the pair of air discharging units 2 and 3. The left-right width of the display assembly 10 may increase forwards.

The left-right width L1 of a tip of the display assembly 10 may be larger than the left-right width L2 of a tip of the protrusion 126.

The display assembly 10 may be disposed at an upper side of the lower body 100. The display assembly 10 may be positioned at an upper side of the lower plate part 103 of the lower body 100. A portion of the display assembly 10 may be positioned at a lower side of the top cover 140, and the display assembly 10 may shield the gap between the pair of air discharging units 2 and 3 between the lower body 100 and the top cover 140. The display assembly 10 may partition left and right the space between the lower body 100 and the top cover 140.

The air discharging unit holder 6 may be shaped so that its left side surface and front surface each are opened.

The air discharging unit holder 6 may play a role as a frame that keeps the pair of air discharging units 2 and 3 in parallel with each other, and the pair of air discharging units 2 and 3 may be positioned left and right about the air discharging unit holder 6 to be spaced apart from each other.

The display assembly 10 may be installed in the air discharging unit holder 6 to partition the air discharging unit holder 6 left and right. In the air conditioner, the space between the left side of the display assembly 10 and the left side end of the rear body 120 may be opened, and the space between the right side of the display assembly 10 and the right side end of the rear body 120 may be opened. One 2 of the pair of air discharging units 2 and 3 may be installed so that a portion thereof is positioned between the left side of the display assembly 10 and the left side end of the rear body 120. The other 3 of the pair of air discharging units 2 and 3 may be installed so that a portion thereof is positioned between the right side of the display assembly 10 and the right side end of the rear body 120. The pair of air discharging units 2 and 3 may be protected by the display assembly 10 and the air discharging unit holder 6.

Each of the pair of air discharging units 2 and 3 may be shaped as a cylinder, and the gap therebetween may increase in a front direction with respect to the middle while decreasing in a rear direction with respect to the middle.

The display assembly 10 may be positioned at a front portion among the front portion and a rear portion of the air discharging unit holder 6. The display assembly 10 may be positioned at a front and central side among a front and left side, front and central side, and front and right side of the air discharging unit holder 6. The air discharging unit holder 6 may be opened for its left side surface, right side surface, front and left side, and front and right side. The front and central portion of the air discharging unit holder 6 may be shielded by the display assembly 10.

Sensors may be disposed in a predetermined area of the casing 4. For example, as illustrated in FIG. 7, a temperature sensor 215a and an air quality sensor 215b may be disposed.

Aspects of the present disclosure are not limited to the configurations and positions of the sensors illustrated in FIG. 7. For example, the temperature sensor 215a may be disposed on the front surface of the air conditioner 1. In addition, the air quality sensor 215b may be disposed on the side of the air inlet of the purifying unit 17.

In some implementations, the air quality sensor 215b is configured to measure indoor air quality and provide a user with information on the current indoor air quality. As such, the air quality sensor 215b being disposed at a position irrespective of an air flow by the air conditioner 1 may be advantageous in measuring indoor air quality.

In this scenario, the air quality sensor 215b may not be configured to measure air quality based on an air flow flowing into the air conditioner 1, and other techniques (e.g., an additional algorithm) may be utilized to determine a filter replacement cycle of the purifying unit 17 using data measured by the air quality sensor 215b.

Figure 8:
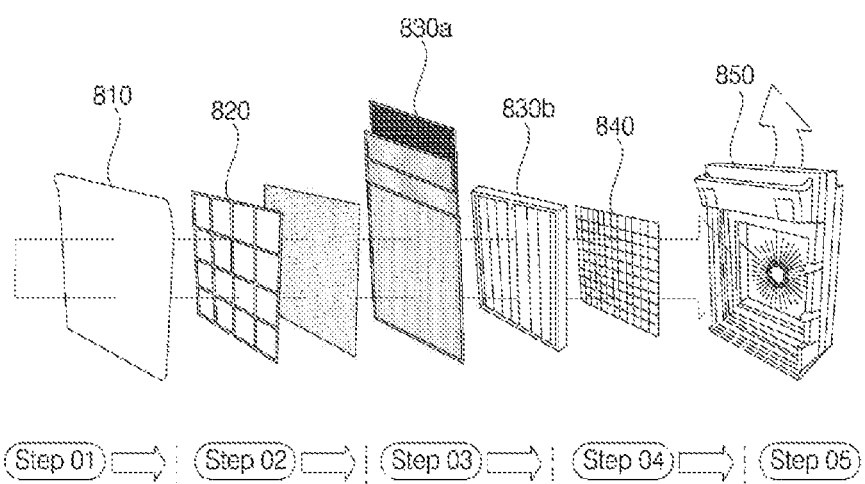
FIG. 8 is a diagram illustrating an example of filter configurations included in a purifying unit according to an implementation of the present disclosure.

FIG. 8 is a diagram illustrating an example of filter configurations included in a purifying unit according to an implementation of the present disclosure.

The purifying unit 17 may include one or more filters. For example, the purifying unit 17 may include a filter part in which a plurality of filters is stacked.

FIG. 8 illustrates an example of a filter part in which six filters are stacked, but aspects of the present disclosure are not limited thereto, and the number, types, and order of arrangement of filters may vary.

Referring to FIG. 8, the purifying unit 17 may include a pre-electrostatic filter 810. The pre-electrostatic filter 810 is an anti-bacterial electrostatic filter and may filter out big-sized dust, human hair, pet hair, etc.

The pre-electrostatic filter 810 may be disposed at the first position in an air flow direction, and may filter out relatively big-sized dust.

The purifying unit 17 may include a pre-filter 820. The pre-filter 820 may filter out relatively big-sized dust. The pre-filter 820 may filter out dust, human hair, pet hair, etc., and protect other filters 830a, 830b, 840, and 850 disposed in the rear thereof in the air flow direction.

In some implementations, the purifying unit 17 may include various functional filters 830a and 830b, and the functional filters 830a and 830b may be disposed behind the pre-electrostatic filter 810 and/or the pre-filter 820.

AS the functional filters 830a and 830b, filters of various types may be adopted to enhance an air purifying function. For example, depending on a user's demand, the functional filters 830a and 830b may be a yellow dust filter, a new house filter, and a baby filter.

The purifying unit 17 may include a High Efficiency Particulate Arrestance Filter (HEPA) 840 capable of filtering out fine dust.

In addition, the purifying unit 17 may include a deodorization filter 850 that filters out odor-bearing particles in air. The deodorization filter 850 is disposed behind the HEPA filter 840 to filter out odor-bearing particles in air passing through the HEPA filter 840. The deodorization filter 850 is formed as an activated carbon filter, and may quickly remove a variety of indoor order, such as harmful gas, food order, moldy order, etc.

In some implementations, such filters 810, 820, 830a, 830b, 840, and 850 are required to be cleaned and managed with attentions, and need to be replaced after a predetermined amount of usage.

Thus, a manufacturer or a service provider used to provide guidance about filter replacement in a predetermined cycle, such as 6 months and 12 months, without consideration of the use environment.

However, replacing filter in a predetermined cycle without consideration of the use environment have problems as follows. In scenarios where an air conditioner is used in a contaminated environment, filter performance may be degraded faster than expected, and, if a filter is not replaced, poor-quality air may be discharged. In scenarios where an air conditioner is used in a clean environment, a filter may be replaced too earlier than expected, which is economically inefficiency.

Thus, there are demands for a method for determining a proper filter replacement cycle in consideration of the use environment, and providing information about filter replacement to a user.

Figure 9:
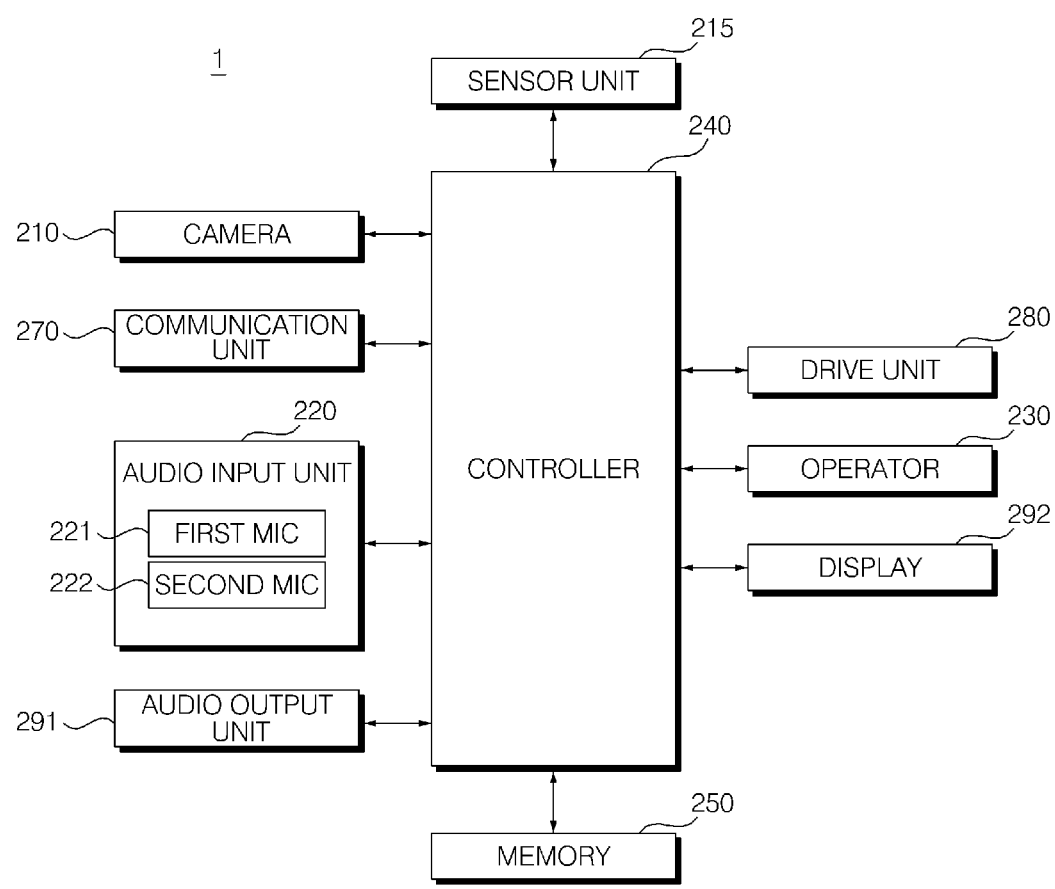
FIG. 9 is a diagram illustrating an example of an internal block diagram of an air conditioner according to an implementation of the present disclosure.

FIG. 9 is a diagram illustrating an example of an internal block diagram of an air conditioner according to an implementation of the present disclosure.

Referring to FIG. 9, the air conditioner 1 according to an implementation of the present disclosure may include a sensor unit 215 including one or more sensors for sensing a variety of data, a controller 240 for controlling overall operations, and a drive unit 280 for controlling an indoor fan, a heat exchanger, a valve, a wind adjusting means, etc. provided inside a main body under the control of the controller 240.

In addition, the air conditioner 1 according to an implementation of the present disclosure includes a purifier unit 17 (see FIG. 3) including one or more filters, and the sensor unit 215 may include an air quality sensor for measuring indoor air quality during operation of the air conditioner 1.

In this scenario, the controller 240 may perform control so as to calculate a filter contamination level based on data measured by the air quality sensor during operation of the air conditioner 1, and also based on an operating time of the air conditioner 1. Then, the controller 240 combines the calculated filter contamination level with a pre-stored filter contamination level. The pre-stored filter contamination level may represent a level of filter contamination that is already stored in the filter prior to the calculation.

For example, combining the calculated filter contamination level with the pre-stored filter contamination level may involve adding the calculated filter contamination level with the pre-stored filter contamination level, or may involve other suitable combinations of the two levels. Then, if the combined (e.g., added-up) filter contamination level satisfies at least one filter replacement condition, then the controller 240 outputs filter replacement indicator information.

In some implementations, the purifying unit 17 includes a filter part in which a plurality of filters is stacked. In this scenario, the at least one filter replacement condition may include a plurality of filter replacement conditions that are set for the plurality of filters (e.g., one condition per filter). For example, the filter replacement condition may represent a maximum allowable filter contamination level.

In addition, the air conditioner 1 according to an implementation of the present disclosure may include an audio input unit 220 for receiving a user's voice command, a memory 250 for storing a variety of data, a communication unit 270 for wirelessly communicating with another electronic device, a display 292 for displaying predetermined information as an image, and an audio output unit 291 for outputting predetermined information through audio sound.

The audio input unit 220 may receive an external audio signal and a user voice command. To this end, the audio input unit 220 may include one or more microphones (MICs). In addition, in order to receive a user's voice command, the audio input unit 220 may include a plurality of MICs 221 and 222. The plurality of MICs 221 and 222 may be at different positions spaced apart from each other, and may acquire an external audio signal and process the audio signal into an electrical signal.

The MICs 221 and 222 may be attached to an inner side surface of a center panel assembly 10B to be in contact or in proximity with an MIC hole 75.

In FIG. 9, illustrated is an example I which the audio input unit 220 includes two MICs, which are a first MIC 221 and a second MIC 222, but aspects of the present disclosure are not limited thereto.

The audio input unit 220 may include a processor for converting analog sound into digital data, or may be connected to the processor to convert a user voice command into data recognizable by the controller 240 or a predetermined server.

In some implementations, the audio input unit 220 may use various noise removal algorithms for removing noise that occurs while receiving a user's voice command.

In addition, the audio input unit 220 may include components for processing an audio signal, such as a filter for removing noise from an audio signal received by each of the MICs 221 and 222 and an amplifier for amplifying a signal output from a filter and outputting the amplified signal.

The memory 250 is to record a variety of information required for operation of the air conditioner 1, and may include a volatile or non-volatile recording medium. The recording medium is to store data readable by a micro processor and may include a Hard Disk Drive (HDD), a Solid State Disk (SSD), a Silicon Disk Drive (SDD), a Rom, a Ram, a CD-ROM, a magnetic tape, a floppy disk, an optical data storage device, etc.

The memory 250 may store control data used for operation of the air conditioner.

In addition, the memory 250 may store data required for calculation and determination, such as an operating time of the air conditioner, data sensed by the sensor unit 215, an air pollution level, a filter contamination level, etc.

In some implementations, the memory 250 may store an audio file of a voice command input by a user, and the stored audio file may be transmitted to a voice recognition server system through the communication unit 270. In addition, the stored audio file may be deleted after a preset period of time or after a predetermined operation.

In some implementations, the memory 250 may store data required for voice recognition, and the controller 240 may process a user's voice input signal received through the audio input unit 220 and perform a voice recognition process.

Alternatively, in some implementations, the air conditioner may include a voice recognition module, and the voice recognition module may perform simple voice recognition, such as call word recognition.

In addition, a call word determinant algorithm for determining whether a voice signal includes a call word may be stored in the memory 250.

Based on the call word determinant algorithm, the controller 240 and the voice recognition module may determine whether the voice signal includes the call word.

In some implementations, simple voice recognition may be performed by the air conditioner 1, and highly sophisticated voice recognition, such as processing natural language, may be performed by the voice recognition server system.

For example, in scenarios where a wake-up voice signal including a predetermined call word is received, the air conditioner 1 may switch to a state in which a voice command is allowed to be received. In this scenario, the air conditioner 1 performs a voice recognition process up to a step of determining whether a call word is included, and recognition of a user voice input may be performed through the voice recognition server system.

Since system resources of the air conditioner 1 are limited, recognition and processing of complicated natural languages may be performed by the voice recognition server system.

Alternatively, determination as to whether a voice input includes a call word may be made by both the air conditioner 1 and the voice recognition server system. Accordingly, it is possible to reduce an error rate in determination as to a call-word voice input and enhance a recognition rate.

Limited data may be stored in the memory 250. For example, data for recognition of a wake-up voice signal including a predetermined call word may be stored in the memory 250. In this scenario, the controller 240 may recognize the wake-up voice signal including the predetermined call word from a user's voice input signal received through the audio input unit 220.

In some implementations, the call word may be set by a manufacturer. For example, "LG Whisen" may be set as a call word. In addition, the call word may be changed by a user.

The controller 240 may perform control to transmit a user's voice command, which is received after the recognition of the wake-up voice signal, to the voice recognition server system through the communication unit 270.

The communication unit 270 may include one or more communication modules to perform wireless communication with another electronic device according to a predetermined communication method and exchange various signals therewith.

Here, the predetermined communication method may be a Wi-Fi communication. In response, a communication module included in the air conditioner 1 may be a Wi-Fi communication module, but aspects of the present disclosure are not limited to the communication method.

Alternatively, the air conditioner 1 may include another type of communication module or a plurality of communication modules.

For example, the air conditioner 1 may include a Near Field Communication (NFC) module, Zigbee communication module, a Bluetooth™ communication module, etc.

Using the Wi-Fi communication module or the like, the air conditioner 1 may be connected with a server included in the voice recognition server system, a predetermined external server, a user's mobile terminal, etc., and support a smart function, such as remote monitoring, remote control, etc.

Using the mobile terminal, the user may check information on the air conditioner 1 or controlling the air conditioner 1.

In addition, the communication unit 270 may communicate with an access point (AP) device, and access a wireless internet network via the AP device, thereby enabled to communicate with other devices.

In addition, the controller 240 may transmit state information of the air conditioner 1, a user's voice command, etc. to the voice recognition server system through the communication unit 270.

In some implementations, when a control signal is received through the communication unit 270, the controller 240 may control the air conditioner 1 to operate in accordance with the received control signal.

The display 292 may display information corresponding to a user's command input, a processing result corresponding to the user's command input, an operation mode, an operation status, an error status, filter replacement indicator information, etc. through an image.

In some implementations, the display 292 may form an inter-layer structure together with a touch pad to implement a touch screen. In this scenario, the display 292 may be used not just as an output device, but as an input device using which information can be input by a user's touch.

In addition, the audio output unit 291 may output an indicator message, such as alert sound, an operation mode, an operation status, and an error status under the control of the controller 240, information corresponding to a user's command input, a processing result corresponding to the user's command input, etc. through audio sound.

In some implementations, the audio output unit 291 may convert an electrical signal from the controller 240 into an audio signal and output the audio signal. To this end, the audio output unit 291 may include a speaker and the like.

The controller 240 may control the audio output unit 291 and the display 292 to provide predetermined information by the use of a visual or audible means to a user in response to each step of the voice recognition process and the process of controlling the air conditioner 1.

The drive unit 280 controls an amount of air discharged into an indoor space, by controlling rotation of a motor connected with the indoor fan. In addition, the drive unit 280 controls driving of the heat exchanger to evaporate or condense a supplied refrigerant so that ambient air is heat-exchanged.

The drive unit 280 is a device that adjusts a direction of air to be discharged into an indoor space in response to a control command of the controller 240, so that the direction of the discharged air is changed to the upward, downward, leftward, or rightward direction when an air outlet is opened.

The drive unit 280 may include a vane driver for driving a vane under the control of the controller 240, and a fan driver for driving a fan under the control of the controller 240.

In some implementations, the drive unit 280 may include a motor driver, and may include an inverter and the like to drive the motor.

In some implementations, the air conditioner 1 may further include an operator 230 for receiving a user input, and a camera 210 for photographing a predetermined range of the surroundings.

The operator 230 may include a plurality of operating buttons and transmit a signal corresponding to a pressed button to the controller 240.

The camera 210 is to phototroph the surroundings of the air conditioner 1 and an external environment thereof, and such a camera may be a plurality of cameras installed at each portions of the air conditioner for photographing efficiency.

For example, the camera 210 may include an image sensor (e.g., a CMOS image sensor) comprised of at least one optical lens and a plurality of photodiodes (e.g., pixels) which form an image using light passing through the optical lens, and a Digital Signal Processor (DSP) for constructing an image based on signals output from the photodiodes. The DSP may generate not just a still image, but also a video consisting of frames which are still images.

In some implementations, it is possible to determine the presence of an inhabitant and location information of the inhabitant based on an image acquired through the camera 210.

In some implementations, the image acquired through the camera 210 may be stored in the memory 250.

The air conditioner 1 according to an implementation of the present disclosure may include a sensor unit 215 including one or more sensors.

For example, the sensor unit 215 may include one or more temperature sensors for sensing indoor and outdoor temperature, a humidity sensor for sensing humidity, an air quality sensor for sensing air quality such as an amount of dust, etc. In addition, in some implementations, the sensor unit 215 may further include a human detection sensor for sensing presence and/or location of an inhabitant.

The sensor unit 215 may sense data on temperature and humidity of an indoor space in which the air conditioner 1 is installed. In addition, the sensor unit 215 may sense air quality in the indoor space in which the air conditioner 1 is installed, such as an amount of carbon dioxide, an amount of fine dust, etc.

The sensor unit 215 may constantly collect data on temperature, humidity, and air quality. Alternatively, the sensor unit 215 may collect data on temperature, humidity, and air quality in a predetermined period of time.

In addition, the controller 240 may control operation of the air conditioner 1 based on data sensed by the sensor unit 215.

The controller 240 may perform control so as to calculate a filter contamination level based on data measured by the air quality sensor of the sensor unit 215 during operation and an operating time, combine (e.g., add) the calculated filter contamination level to a pre-stored filter contamination level, and, if the combined (e.g., added-up) filter contamination level satisfies the filter replacement condition, output filter replacement indicator information.

In some scenarios, counting only the operating time to determine whether to replace a filter may not accurately reflect a level of contamination, which may vary depending on the use environment.

Thus, some implementations of the present disclosure implement a weighting technique according to an air pollution level during operation of the air conditioner in an operating time by reflecting both (i) data measured by the air quality sensor and (ii) the operating time of the air conditioner, so that a filter replacement cycle may be determined more accurately. For example, in some implementations, a machine-learning technique may be implemented to adaptively learn an accurate determination of air pollution level based on (i) data measured by the air quality sensor (ii) the operating time of the air conditioner.

In some implementations, the controller 240 may determine the quantity of introduced air based on the operating time and the quantity of airflow during the operating time, determine an air pollution level based on data measured by the air quality sensor during the operation of the air conditioner, and calculate the filter contamination level based on the quantity of introduced air and the air pollution level.

According to implementations of the present disclosure, even without a separate device that is dedicated to inspecting a contamination level of a filter, an air quality sensor may be utilized by the air conditioning system to adaptively determine a contamination level of a filter. Thus, the system may provide a user with accurate air quality information to better anticipate a filter replacement time based on a period of usage, a quantity of airflow, and air status information.

In some systems, the need for filter replacement is typically guided in a predetermined cycle without consideration of the use environment of the air conditioner 1. For example, in some systems that implement an air purifier, if the air conditioner is used for a predetermined period of time during a day, then a filter replacement cycle estimated to be 6 to 12 months is provided as part of filter cleaning guidance.

However, in scenarios where the air conditioner 1 is used in a contaminated environment, performance of a filter may be degraded much faster than anticipated and rather poor-quality air may be discharged. On the other hand, in scenarios where the air conditioner is used in a clean environment, frequent replacement of a clean filter may be unnecessary, and may be economically inefficient.

Since a contamination level of a filter depends on (e.g., is proportional to) a quantity of introduced air and an air pollution level, the quantity of introduced air and the air pollution level are variants directly affecting the contamination of the filter.

Thus, according to an implementation of the present disclosure, the quantity of air introduced into the air conditioner 1 and a status of the air may be estimated and measured, and information on the quantity of airflow during operation of the air conditioner and an amount of air pollutants introduced into the air quality sensor may be measured.

Quantity of Introduced Air=(Operating time)×(Quantity of Airflow)

Air Pollution Level=Air Quality Measured During Operation

Filter Contamination Level=(Quantity of Introduced Air)×(Air Pollution Level)

As described above, the controller 240 may anticipate a filter replacement time by estimating a filter contamination level, so that a time for indicating the need for filter replacement is determined more accurately.

In addition, by notifying a user of a more accurate filter replacement time, it is possible to maximize an air conditioning function and efficiency thereof.

For example, for users who use the air conditioner relatively less frequently, an accurate filter replacement time longer than average may be provided, thereby achieving economic efficiency.

In addition, for users who use the air conditioner relatively more frequently, a filter replacement time earlier than average may be provided, thereby preventing degradation in performance of the air conditioner 1.

In some implementations, the purifying unit 17 includes a filter part in which a plurality of filters is stacked. In this scenario, a filter replacement condition may be set for each of the plurality of filters.

Thus, the controller 240 may determine whether a combined (e.g., added-up) filter contamination level satisfies the filter replacement condition set for each of the plurality of filters, and, if a particular filter satisfies a filter replacement condition set therefor, then the controller 240 may notify a user that replacement of the particular filter is required. For example, the filter replacement condition may represent a maximum allowable filter contamination level, or other suitable condition that relates to replacement of a filter.

In some implementations, under the control of the controller 240, the audio output unit 291 may output a voice guidance message that guides filter replacement indicator information through voice. As the filter replacement indicator information is guided in the form of a voice guidance message, even an unskillful user is able to notice need for replacement of a particular filter even without a special command or input.

In some implementations, the display 292 may display the filter replacement indicator information.

In some implementations, the presence of a user in a particular space, and location information of the user may be determined based on data acquired by the camera 210 or the sensor unit 215. In addition, the controller 240 may determine proximity of the user through the camera 210 or the sensor unit 215.

In this scenario, when the proximity of the user is detected, the controller 240 may perform control such that the audio output unit 291 and/or the display 292 outputs the filter replacement indicator information.

In some implementations, the controller 240 may perform control such that the filter replacement indicator information is transmitted to another electronic device through the communication unit 270.

For example, as the air conditioner 1 transmits the filter replacement indicator information to a predetermined server or a user's mobile terminal, the user is allowed to check filter-related information of the air conditioner 1 through a different device.

In some implementations, the controller 240 may perform control such that a different operation related to a filter is performed based on data sensed by the sensor unit 215.

For example, in order to prevent formation of frost caused by high humidity or difference in temperature, the controller 240 may perform control such that internal dehumidification is performed based on humidity and temperature data to dehumidify a filter.

In addition, the controller 240 may guide a time of cleaning a filter, and re-calculate an amount of contamination depending on whether cleaning is performed. Accordingly, a remaining lifetime of the filter may be anticipated more accurately.

Figure 10:
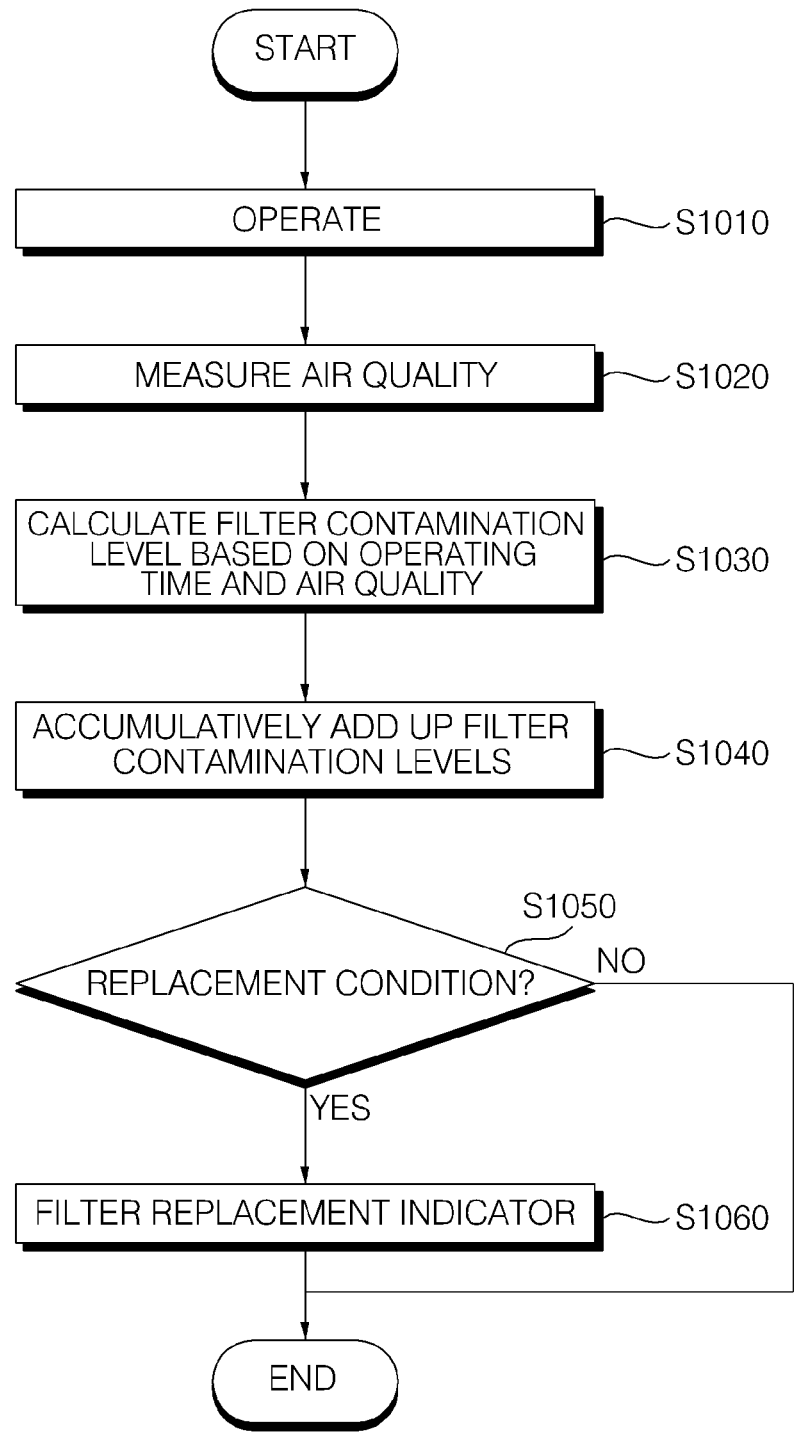
FIG. 10 is a flowchart illustrating a control method of an air conditioner according to an implementation of the present disclosure.

FIG. 10 is a flowchart illustrating a control method of an air conditioner according to an implementation of the present disclosure.

Referring to FIG. 10, the air conditioner 1 operates in a predetermined mode according to various settings (S1010). In this scenario, the controller 240 may measure or count an operating time of the air conditioner 1.

In some implementations, under the control of the controller 240, the air quality sensor of the sensor unit 215 may measure the indoor air quality during operation of the air conditioner 1 (S1020).

The air quality sensor may constantly measure indoor air quality while the air conditioner 1 is during operation, or may measure indoor air quality in a predetermined period of time, or may measure indoor air quality with various timing characteristics. In some implementations, data measured by the air quality sensor may be stored in the memory 250.

The controller 240 may calculate a filter contamination level based on the data (e.g., an accumulated or average value) measured by the air quality sensor during the operation of the air conditioner, and also based on an operating time of the air conditioner (S1030).

For example, the controller 240 may calculate a filter contamination level by multiplying an accumulated value or an average value of data (measured by the air quality sensor during the operation) with an operating time of the air conditioner, or by taking another suitable weighted combination of the air quality data and the operating time.

In some implementations, the controller 240 may determine the quantity of introduced air based on the quantity of airflow during the operating time and the operating time. For example, the controller 240 may determine the quantity of airflow by multiplying the operating time and the quantity of airflow.

The controller 240 may determine an air pollution level based on data measured by the air quality sensor during the operation, and calculate the filter contamination level based on the quantity of introduced air and the air pollution level.

For example, the controller 240 may determine a filter contamination level by multiplying the quantity of introduced air and an air pollution level. According to some implementations of the present disclosure, by checking a contamination level of a multi-filter according to a more sophisticated air quality measurement, the controller 240 may detect an exact filter in need of replacement.

In some implementations, various types of data computed in the controller 240 may be stored in the memory 250.

The controller 240 may combine (e.g., add) the calculated filter contamination level to a pre-stored filter contamination level (S1040). The pre-stored filter contamination level may represent a level of filter contamination that is already stored in the filter prior to the calculation. For example, the pre-stored filter contamination level may be obtained or determined based on various types of information, such as based on historical usage data of the air conditioner, or based on various settings of the air conditioner.

When the combined (e.g., added-up) filter contamination level satisfies at least one filter replacement condition (S1050), then the controller 240 may perform control to output filter replacement indicator information (S1060).

Here, the at least one filter replacement condition may include a plurality of conditions that are set for different types of the filter. For example, the filter replacement condition may represent a maximum allowable filter contamination level.

The controller 240 may perform control such that the filter replacement indicator information is displayed on the display 292 or guided by the audio output unit 291 in the form of voice.

According implementations of the present disclosure, the controller 240 may inform a user of a filter replacement time which is better optimized in consideration of a remaining use period and an expected period required to order and receive a new filter.

Figure 11:
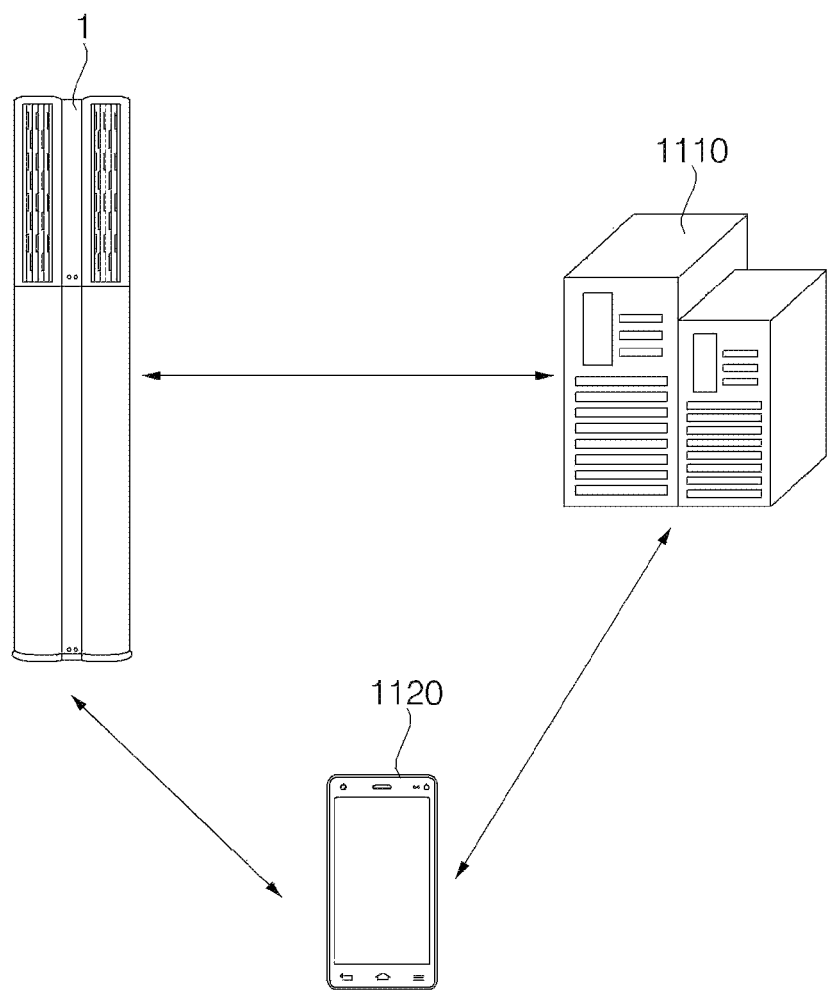
FIGS. 11 to 13 are diagrams illustrating an air conditioner and a control method thereof according to an implementation of the present disclosure.
Figure 12:
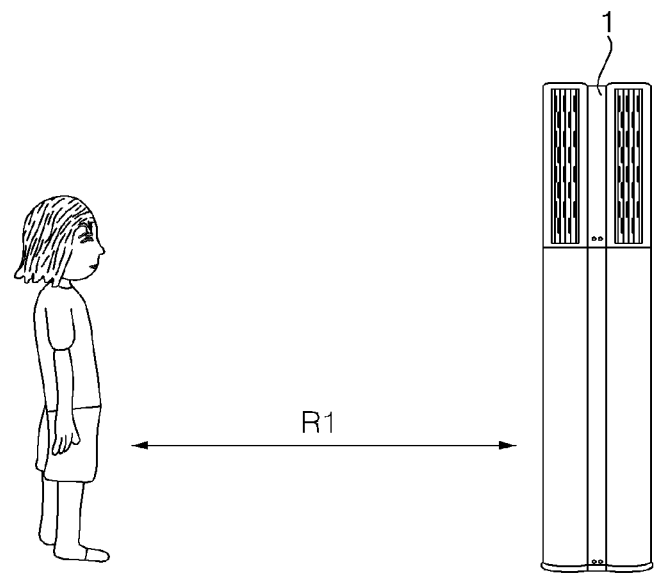
Figure 12:
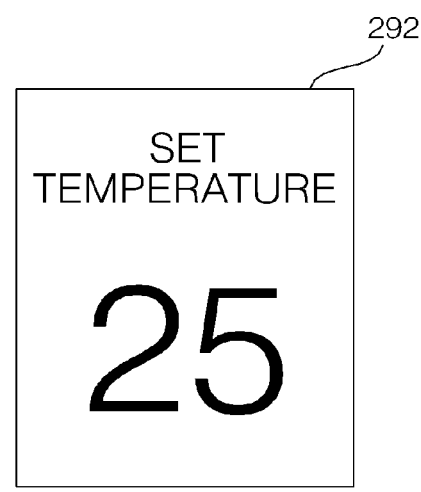
Figure 13:
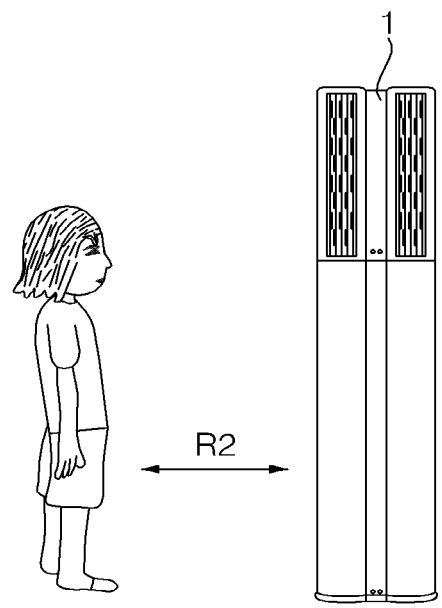
Figure 13:
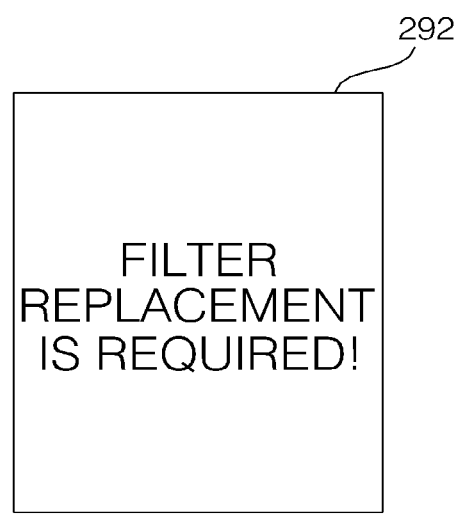

FIGS. 11 to 13 are diagrams illustrating an air conditioner and a control method thereof according to an implementation of the present disclosure.

Referring to FIG. 11, the air conditioner 1 according to an implementation of the present disclosure may transmit and receive various types of data with respect to one or more computing devices, such as a predetermined server 1110 and/or a mobile terminal 1120 of a user.

The controller 240 may control the communication unit 270 to transmit the filter replacement indicator information to a different electronic device.

Alternatively, the controller 240 may control the communication unit 270 to transmit data including data measured by the sensor unit 215, an operating time, etc. to a different electronic device.

The communication unit 270 may transmit the filter replacement indicator information to one or more computing systems, such as a predetermined server 1110. By transmitting the filter replacement indicator information to the predetermined mobile terminal 1120 or any other home appliance, the server 1110 may allow a user to check information about replacement of a filter of the air conditioner 1 through a different device.

Alternatively, the communication unit 270 may transmit the filter replacement indicator information directly to the preset mobile terminal 1120.

In some implementations, the communication unit 270 may transmit data including data measured by the sensor unit 215, an operating time, etc. to the server 1110 and/or the mobile terminal 1120 of the user.

Accordingly, the user is able to check the operating time of the air conditioner 1, data on indoor air quality, etc. through the mobile terminal 1120.

In addition, the server 1110 may determine a filter replacement time based on data received from the air conditioner 1.

For example, the server 1110 may determine the quantity of introduced air based on the quantity of airflow during the operating time and the operating time, determine an air pollution level based on data measured by the air quality sensor during the operation of the air conditioner, and calculate the filter contamination level based on the quantity of introduced air and the air pollution level.

According to the present disclosure, the controller 240 may perform control such that the filter replacement indicator information is displayed on the display 292 or the filter replacement indicator information is guided by the audio output unit 291 in the form of voice.

In some scenarios, it may be inefficient to provide guidance to a user when the user is not positioned in a predetermined space where the air conditioner 1 is placed.

Thus, the air conditioner 1 may sense the presence of an inhabitant through a human detection sensor which may be included in the camera 210 or the sensor unit 215.

The controller 240 may perform control such that filter replacement indicator information or a voice guidance message including the filter replacement indicator information is output only when the camera 210 or the sensor unit 215 detects the presence of an inhabitant.

Alternatively, the controller 240 may perform control such that filter replacement indicator information or a voice guidance message including the filter replacement indicator information is output only when proximity of a user is detected.

Referring to (a) of FIG. 12, the controller 240 may determine a distance R1 to a user through the camera 210 or the sensor unit 215.

When the determined distance R1 to the user is equal to or greater than a reference distance, the controller 240 may display, on the display 292, general information that is, for example, set temperature and the like, as illustrated in (b) of FIG. 12.

Afterwards, when a distance R2 to the user becomes smaller than the reference distance since the user moves in more proximity to the air conditioner 1, as illustrated in (a) of FIG. 13, information indicating the need for filter replacement may be displayed on the display 292.

According to at least one of implementations of the present disclosure, as a proper filter replacement cycle is determined in consideration of the use environment and filter replacement-related information is provided to a user, user convenience may be enhanced.

In addition, according to at least one of implementations of the present disclosure, a high-quality air purifying function may be provided.

In addition, according to at least one of implementations of the present disclosure, as a voice guidance is provided to allow even an unskillful user to easily use the air conditioner, user convenience may be enhanced.

The air conditioner according to the present disclosure should not be limited to configurations and methods of the implementations as described above, and some or all of the implementations may be selectively combined with one another to enable various alterations thereof.

In some implementations, the control method of an air conditioner according to the present specification can be implemented with processor-readable codes in a processor-readable recording medium provided to a network device.

The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. And, such modifications should not be individually understood from the technical idea or prospect of the present.

What is claimed is:

1. An air conditioner comprising:
a purifying unit comprising at least one filter;
a sensor unit comprising an air quality sensor; and
a controller configured to:
   calculate a filter contamination level based on (i) data regarding indoor air quality measured by the air quality sensor during an operation of the air conditioner, and (ii) an operating time of the air conditioner;
   combine the calculated filter contamination level with a pre-stored filter contamination level to obtain a combined filter contamination level; and
   based on the combined filter contamination level satisfying at least one filter replacement condition, output filter replacement indicator information.

2. The air conditioner of claim 1, wherein the controller is further configured to:
   determine a quantity of introduced air based on (i) a quantity of airflow during the operation of the air conditioner, and (ii) the operating time of the air conditioner;
   determine an air pollution level based on the data regarding indoor air quality measured by the air quality sensor during the operation of the air conditioner; and
   calculate the filter contamination level further based on the quantity of introduced air and the air pollution level.

3. The air conditioner of claim 1, wherein the purifying unit comprises a filter part in which a plurality of filters is stacked.

4. The air conditioner of claim 3, wherein the at least one filter replacement condition comprises a plurality of filter replacement conditions that each corresponds to a respective filter among the plurality of filters, and
wherein the controller is further configured to determine whether the combined filter contamination level satisfies the plurality of filter replacement conditions that are set for the plurality of filters.

5. The air conditioner of claim 1, further comprising an audio output unit, and
wherein the controller is further configured to output, through the audio output unit, the filter replacement indicator information as a voice guidance message.

6. The air conditioner of claim 1, further comprising:
a camera; and
a display unit,
wherein the controller is further configured to:
   detect, through the camera, a proximity of a user; and
   display, through the display unit, the filter replacement indicator information based on a detection of the proximity of the user.

7. The air conditioner of claim 1, further comprising a communication unit,
wherein the controller is further configured to transmit, through the communication unit, the filter replacement indicator information to a different electronic device.

8. The air conditioner of claim 1, wherein the controller is configured to combine the calculated filter contamination level with the pre-stored filter contamination level by adding the calculated filter contamination level to the pre-stored filter contamination level.

9. The air conditioner of claim 1, wherein the controller is configured to calculate the filter contamination level based on a weighted combination of (i) the data regarding indoor air quality measured by the air quality sensor during the operation of the air conditioner, and (ii) the operating time of the air conditioner.

10. The air conditioner of claim 1, wherein the controller is further configured to:
   determine the pre-stored filter contamination level based on past operations of the air conditioner.

11. A method of controlling an air conditioner comprising one more filters, the method comprising:
   measuring, through an air quality sensor, indoor air quality during an operation of the air conditioner;
   calculating a filter contamination level based on (i) data measured by the air quality sensor during the operation of the air conditioner, and (ii) an operating time of the air conditioner;
   combining the calculated filter contamination level with a pre-stored filter contamination level to obtain a combined filter contamination level; and
   based on the combined filter contamination level satisfying at least one filter replacement condition, outputting filter replacement indicator information.

12. The method of claim 11, wherein calculating the filter contamination level comprises:
   determining a quantity of introduced air based on (i) a quantity of airflow during the operation of the air conditioner, and (ii) the operating time of the air conditioner;
   determining an air pollution level based on the data measured by the air quality sensor during the operation of the air conditioner; and
   calculating the filter contamination level further based on the quantity of the introduced air and the air pollution level.

13. The method of claim 11, wherein the at least one filter replacement condition is set for each type of one or more filters of an air purifying unit of the air conditioner.

14. The method of claim 11, wherein outputting the filter replacement indicator information comprises (i) displaying the filter replacement indicator information on a display unit, or (ii) outputting the filter replacement indicator information as a voice guidance message through an audio output unit.

15. The method of claim 11, wherein outputting the filter replacement indicator information comprises:
   based on a detection of a proximity of a user, (i) displaying the filter replacement indicator information on a display unit, or (ii) outputting the filter replacement indicator information as a voice guidance message through an audio output unit.

16. The method of claim 11, further comprising transmitting, through a communication unit, the filter replacement indicator information to a different electronic device.

17. The method of claim 11, wherein combining the calculated filter contamination level with the pre-stored filter contamination level comprises:
   adding the calculated filter contamination level to the pre-stored filter contamination level.

18. The method of claim 11, wherein calculating the filter contamination level is based on a weighted combination of (i) the data regarding indoor air quality measured by the air quality sensor during the operation of the air conditioner, and (ii) the operating time of the air conditioner.

19. The method of claim 11, further comprising determining the pre-stored filter contamination level based on past operations of the air conditioner.

* * * * *